United States Patent
Shinozaki

(10) Patent No.: US 6,773,068 B2
(45) Date of Patent: Aug. 10, 2004

(54) SLIDE TYPE FOLDABLE SEAT CAPABLE OF BEING KICKED UP

(75) Inventor: Katsuhiko Shinozaki, Tochigi-ken (JP)

(73) Assignee: TS Tech Co., Ltd. (JP)

( * ) Notice: Subject to any disclaimer, the term of this patent is extended or adjusted under 35 U.S.C. 154(b) by 0 days.

(21) Appl. No.: 10/202,784

(22) Filed: Jul. 25, 2002

(65) Prior Publication Data

US 2003/0025373 A1 Feb. 6, 2003

(30) Foreign Application Priority Data

| Aug. 1, 2001 | (JP) | ........ 2001-233569 |
| Aug. 1, 2001 | (JP) | ........ 2001-233584 |
| Aug. 30, 2001 | (JP) | ........ 2001-261892 |
| Aug. 30, 2001 | (JP) | ........ 2001-262188 |
| Aug. 31, 2001 | (JP) | ........ 2001-263786 |
| Aug. 31, 2001 | (JP) | ........ 2001-310726 |
| Apr. 12, 2002 | (JP) | ........ 2002-110966 |

(51) Int. Cl.$^7$ .................................. A47C 1/02
(52) U.S. Cl. .......... 297/344.1; 297/331; 297/378.13; 297/335; 296/65.13
(58) Field of Search .......... 296/65.13, 65.14, 296/65.15, 65.09, 65.05, 69; 248/424, 429, 430; 297/331, 335, 336, 378.13, 378.12

(56) References Cited

U.S. PATENT DOCUMENTS

| 4,606,577 A | | 8/1986 | Hirama et al. |
| 5,626,391 A | * | 5/1997 | Miller et al. ............ 297/331 |
| 5,765,894 A | * | 6/1998 | Okazaki et al. .......... 296/65.03 |
| 5,967,604 A | * | 10/1999 | Yoshida et al. ......... 297/216.19 |
| 6,059,345 A | * | 5/2000 | Yokota ................. 296/65.14 |
| 6,164,712 A | * | 12/2000 | Ajisaka et al. .......... 296/65.03 |
| 6,244,660 B1 | * | 6/2001 | Yoshimatsu ............. 297/344.1 |
| 6,354,553 B1 | * | 3/2002 | Lagerweij et al. ........ 248/430 |
| 6,361,098 B1 | * | 3/2002 | Pesta et al. ............ 296/65.03 |
| 6,371,556 B1 | * | 4/2002 | Arai ..................... 297/331 |
| 6,375,255 B1 | * | 4/2002 | Maruta et al. ............ 297/15 |
| 6,568,756 B2 | * | 5/2003 | Sugimoto et al. ......... 297/335 |
| 6,595,588 B2 | * | 7/2003 | Ellerich et al. .......... 297/331 |
| 2002/0047287 A1 | * | 4/2002 | Kawasaki ................. 296/64 |

* cited by examiner

Primary Examiner—Peter M. Cuomo
Assistant Examiner—Erika Garrett
(74) Attorney, Agent, or Firm—Dann, Dorfman, Herrell and Skillman, P.C.

(57) ABSTRACT

In a seat in which the seat is placed so as to be freely moved by a slide rail 4, a striker lock 7 retained and mounted to a striker 8 standing up from a vehicle body floor F is provided in a lower portion close to a rear end of a lower rail 4b, and the seat is placed so as to be freely kicked up from a rear portion side to an upper side in a folded state around a supporting shaft 6 axially supporting and pivoting a front end side of the lower rail 4b corresponding to a supporting point, there is provided a switching mechanism 10 which makes it impossible to unlock the striker lock 7 by an operation lever when the seat is kept at a front seated position, and makes it possible to lock the striker lock 7 by the operation lever when the seat is moved to a predetermined rear position, whereby it is possible to mechanically execute a step of moving the seat to the predetermined position in the rear side within the vehicle, thereafter unlocking the striker lock 7 and kicking up the seat.

15 Claims, 31 Drawing Sheets

SLIDE TYPE FOLDABLE SEAT CAPABLE OF BEING KICKED UP

TECHNICAL FIELD

The present invention relates to a slide type foldable seat in which a seat is placed so that a position thereof can be moved in a longitudinal direction of a vehicle body by a slide rail, and is placed so that the seat can be kicked up from a rear portion side to an upper side in a folded state of a seat back.

BACKGROUND ART

In general, a seat for a motor vehicle is constructed by assembling a seat back in a seat cushion in a foldable manner by a reclining mechanism. Further, the seat is placed on a vehicle body floor by a slide rail assembled by an upper rail mounted to a lower portion side of the seat cushion and a lower rail slidably supporting the upper rail, so as to move the position of the seat in the longitudinal direction within the vehicle.

In the seat for the motor vehicle, in particular, in a rear seat mounted in a station wagon or the like, in order to secure a receiving space for loads and the like, it is planned that the seat is structured such as to be capable of being kicked up from the rear portion side to the upper side in the folded state of the seat back.

In order to structure the seat such as to be capable of being kicked up, a striker lock may be assembled so as to be capable of being opened in accordance with a lever operation of a passenger, by axially supporting and pivoting a front end side of the lower rail to a stand leg portion standing up from the vehicle body floor by a supporting shaft and locking and mounting a rear end side of the lower rail to a striker standing up from the vehicle body floor by the striker lock arranged in a lower portion close to a rear end of the rail.

However, in the case that the seat is structured such as to be capable of being kicked up only by unlocking the striker lock, since a head rest generally protrudes forward from the seat cushion in the folded state of the seat back, it is assumed that the head rest is brought into contact with a back portion of a front side seat or with a floor surface of the vehicle body floor so as to be stopped in the middle of kicking up.

In order to avoid the matter, the seat should be kicked up by unlocking the striker lock after sliding the seat to a predetermined position in a rear side within the vehicle and moving so that the head rest is positioned in the rear side within the vehicle rather than a front end side of the lower rail axially supported and pivoted to the leg portion standing up from the vehicle body floor in the folded state of the seat back.

However, when the structure is made such that the seat can be kicked up only by unlocking the striker lock in the manner mentioned above, a step of at first sliding the seat to the predetermined position in the rear side within the vehicle and thereafter unlocking the striker lock so as to kick up the seat is not always executed.

A slide lock is provided in the slide rail mentioned above. The slide lock is assembled by an operation lever provided in a front side lower portion of the seat cushion, and lock plates positioned in respective side portions of the upper rail.

The lock plate is positioned along a longitudinal direction of the upper rail, is axially supported in a portion close to a front end by a supporting shaft inserted and fixed to a plate surface of the upper rail, and is mounted so as to be always energized upward by a spring around the supporting shaft corresponding to a supporting point in a portion close to a rear end. A retainer piece in which a plurality of receiving holes are open to the plate surface is provided in the lock plate so as to protrude to a side portion from a lower end edge. A plurality of protruding teeth engaging with the receiving holes of the retainer piece are provided in the lower rail by notching a lower end line of an inward bend flange in a concavo-convex shape toward a longitudinal direction.

Since a plurality of protruding teeth and the receiving holes of the retainer piece are engaged with each other, the slide lock locks the upper rail by the lower rail so as not to slide, and the structure is made such that the rear end side of the lock plate swings downward around the supporting shaft corresponding to the supporting point against the spring so as to unlock, when pulling up the operation lever.

Since the slide lock is provided, it is assumed that the seat in the folded state slides down together with the kicking-up in the case that the passenger grips by mistake the operation lever of the slide lock by a hand and unlocks the slide lock at a time of kicking up the seat.

An object of the present invention is to provide a slide type foldable seat structured such that the seat can be securely kicked up from a rear portion side to an upper side in a folded state of a seat back without generating a matter that a head rest is brought into contact with a back portion of a front side seat or with a floor surface of a vehicle body floor so as to be stopped in the middle of kicking up, by mechanically inducing a step of at first sliding the seat to a predetermined position in a rear side within the vehicle and thereafter unlocking a striker lock.

Further, an object of the present invention is to provide a slide type foldable seat structured such that a slide lock can be kept in a locked state in which an unlocking operation can not be executed even when a passenger grips by mistake an operation lever of a slide lock, and a seat in a folded state can be kicked up with keeping a slide position in a rear side within the vehicle.

DISCLOSURE OF THE INVENTION

In accordance with the present invention, there is provided a slide type foldable seat comprising:

a slide rail assembled by an upper rail mounted to a lower portion side of a seat cushion and a lower rail slidably supporting the upper rail;

a slide lock in which a front end side of the lower rail is axially supported and pivoted to a stand leg portion standing up from a vehicle body floor around a supporting shaft, thereafter a rear end side is locked and mounted to a striker standing up from the vehicle body floor by a striker lock provided in a lower portion close to a rear end of the rail, and the upper rail is locked to the lower rail;

an operation lever unlocking the slide lock;

an operation lever placed so as to move a position of the seat in a longitudinal direction of the vehicle body by the slide rail, and unlocking the striker lock; and the supporting shaft axially supporting and pivoting the front end side of the lower rail;

the seat being placed so as to be kicked up from a rear portion side in a folded state of the seat back to an upper side, wherein a switching mechanism making it impossible to unlock the striker lock by the operation lever when the seat is kept in a seated position, and making it possible to unlock he striker lock by the operation lever when the seat is moved to a predetermined rear position is assembled in the operation lever.

In the case that the switching mechanism is provided, since the switching mechanism can not be switched to a mechanism operable by the lever operation when the seat is only folded at the seated position in the front side within the vehicle, the striker lock is not unlocked even when the passenger operates the switching mechanism by means of lever, so that it is impossible to kick up a whole of the seat.

On the contrary, when sliding the seat to a predetermined position in the rear side within the vehicle, the switching mechanism is switched to the mechanism operable by the lever operation. Accordingly, since the passenger operates the switching mechanism by means of lever, whereby the striker lock is unlocked, it is possible to kick up the whole of the seat from the rear end side to the upper side. Therefore, it is possible to avoid the matter that the head rest is brought into contact with the back portion of the front side seat or brought into contact with the floor surface of the vehicle body floor so as to be stopped in the middle of the kicking-up.

The switching mechanism is structured such that a placing plate corresponding to a base mounted and fixed to a lower portion side of a seat cushion is provided, a first rotary plate corresponding to an operation lever and a second rotary plate opposing to the first rotary plate are axially supported by a first supporting shaft fixed to a plate surface of the placing plate in a standing manner, a third rotary plate opposing to the second rotary plate and a fourth rotary plate opposing to the third rotary plate are axially supported by a second supporting shaft fixed to a plate surface of the second rotary plate in a standing manner at a position apart from the first supporting shaft, a tension coil spring is arranged between the fourth rotary plate and the third rotary plate, return coil springs are arranged between the placing plate and the first rotary plate and between the second rotary plate and the fourth rotary plate respectively, a substantially L-shaped guide hole obtained by connecting a first circular arc portion around the first supporting shaft to a second circular arc portion around the second supporting shaft is provided in the first rotary plate, a circular arc-shaped guide hole toward a middle point of the guide hole from a hole end aligning with a hole end of the second circular arc portion is provided in the second rotary plate, a slide pin toward the second and first rotary plates is provided in a protruding manner in the third rotary plate, the guide pin is arranged so as to be inserted to a hole interior middle point within the substantially L-shaped guide hole provided in the first rotary plate from a hole interior portion of the circular arc-shaped guide hole provided in the second rotary plate, a first traction wire is connected to a portion between the first rotary plate and the striker lock, and a second traction wire is connected to a portion between the fourth rotary plate and the upper rail.

In accordance with the switching mechanism, the structure is made such that when the second traction wire is pulled by the upper rail in accordance with a rear movement of the seat, the fourth rotary plate and the third rotary plate swing and rotate around the second supporting shaft, the slide pin protruding from the third rotary plate moves to the hole end of the second circular arc portion from the middle point of the substantially L-shaped guide hole, and the first traction wire is switched so as to be capable of being pulled by the first rotary plate by pressing the slide pin by means of the second circular arc portion and the circular arc-shaped guide hole, on the contrary, when the seat is kept at the seated position, the second traction wire is not pulled, so that the guide hole receives the slide pin by the second circular arc portion around the first supporting shaft from the middle point so as to keep the first traction wire in a state in which it can not be pulled by the first rotary plate, even by pulling the first rotary plate.

In the switching mechanism, the first traction wire is provided so as to independently axially support and pivot a hook-shaped latch engaging with and disengaging from the striker, and a cam-shaped ratchet locking the latch engaging with the striker by the supporting shaft built on top of a side plate provided with a downward U-shaped receiving port receiving the striker, energizing the latch by spring in a disengaging direction from the striker, and be connected to the ratchet of the striker lock pulling the ratchet by spring in an engaging direction with the latch.

The second traction wire is provided so as to mount a protruding plate provided with a long hole directing to the slide direction of the upper rail on a plate surface in a side portion of the upper rail, attach a slide plate protruding a supporting pin slidably engaging with the long hole of the protruding plate to the protruding plate by the supporting pin, and be connected to a slide plate of a wire pulling mechanism provided with a stopper piece stood up from the lower plate and brought into contact with the supporting pin of the slide plate immediately before a backward movement dead point of the seat.

A flat belt strap is provided in the switching mechanism by being drawn from the first rotary plate corresponding to the operation lever. This strap 11 is constituted by a round bar member made of metal, is provided so as to be inserted to a strap holder mounted and fixed to the placing plate of the switching mechanism and draw out the grip portion to the external side.

The strap holder is constituted by a supporting frame which has a substantially quadrilateral plan shape and is bent in an L shape in a side view, and a guide shaft which is in parallel to a lower horizontal shaft portion of the supporting frame at a distance of an insertion gap for the strap therefrom, and is arranged over and fixed to a pulling side of the strap on middle portions of side shaft portions inclined to right and left oblique downward sides, and is provided by welding and fixing the supporting frame to the placing plate of the switching mechanism.

In the strap holder, since the strap can be provided so as to be suspended by the supporting frame from the placing plate of the switching mechanism, the strap does not form an obstacle even when the strap is positioned around feet of a rear passenger, and it is possible to prevent the strap from winding around a peripheral mechanism, so that the strap can be provided with a good usability.

In connection with the pulling operation of the strap, since the supporting frame is positioned on the same plane as that of the first rotary plate of the switching mechanism, and the guide shaft is positioned on an extension line of the first rotary plate, it is possible to linearly apply the pulling force to the first rotary plate even when pulling the strap from the strap holder to the upper side, so that it is possible to stably interlock the switching mechanism by the first rotary plate.

In addition to the structure mentioned above, a stopper pin which prevents the grip portion from being shifted from the insertion gap between the lower horizontal shaft portion of the supporting frame and the guide shaft to the inner side is provided in the strap by being sewn within a loop base portion of the grip portion. With the help of the stopper pin, since the loop-shaped grip portion is not shifted to the inner side from the insertion gap, the strap can be provided so as to be easily operated.

The slide type foldable seat is structured so as to be automatically kicked up by providing with a kick-up spring on an axis of the supporting shaft inserted into the lower rail of the slide rail and the stand leg portion. Further, a speed reduction damper restricting a kick-up speed of a whole of the seat is provided so as to gradually reduce a speed of the whole of the instantaneously jumping up seat from the middle of the kicking up.

Together with the kick-up spring and the speed reduction damper, an elastic pad restricting a kick-up attitude of the whole of the seat is provided so as to be brought into contact with the stand leg portion. Spacer pads adjusting the kick-up attitude of the whole of the seat are provided in the stand leg portions in both sides.

The slide lock of the slide rail is positioned along the longitudinal direction in each of the side portions of the upper rail, and is constituted by a lock plate provided so as to axially support a portion close to a front end by the supporting shaft inserted and fixed to the plate surface of the upper rail, always energize a portion close to a rear end upward by a spring and protrude the retainer piece having a plurality of receiving holes opened on the plate surface from a lower end edge to a side portion, a plurality of protruding teeth provided by notching a lower end line of the lower rail in a concavo-convex shape toward a longitudinal direction, and an operation lever mounted to a front end side of the lock plate and provided in a lower portion in a front side of the seat cushion. Since a plurality of protruding teeth and the receiving holes of the retainer piece are engaged with each other, the slide lock locks the upper rail by the lower rail so as not to slide, and the slide lock is provided so that the rear end side of the lock plate swings downward around the supporting shaft corresponding to the supporting point against the spring so as to unlock, when pulling up the operation lever.

A stopper mechanism locking the lock plate so as not to be unlocked when the striker lock is operated so as to be unlocked, is assembled in the slide lock. The stopper mechanism is structured by axially supporting and pivoting a stopper piece capable of being brought into contact with the protruding piece provided in the lock plate to the side portion of the lower rail by the supporting shaft, and connecting the stopper piece to the ratchet of the striker lock by a connection rod.

Since the stopper mechanism is provided, even when the passenger grips by mistake the operation lever of the slide lock by a hand, it is possible to keep the slide lock in a locking state in which the slide lock can not be unlocked, and it is possible to kick up the seat in the folded state with keeping the slide position at the rear side within the vehicle.

In this slide type foldable seat, since the operation lever of the striker lock and the strap are provided in the lower portion in the rear side of the seat cushion in place that the operation lever of the slide lock is provided in the lower portion in the front side of the seat cushion, the sitting passenger can adjust the longitudinal position of the seat in a normal sitting attitude, and can execute the kick-up operation of the seat by positioning in the rear side of the seat to be kicked up.

The other features than those described above will be apparent in an embodiment of the present invention described later.

MODE FOR CARRYING OUT THE INVENTION

Figure 1:
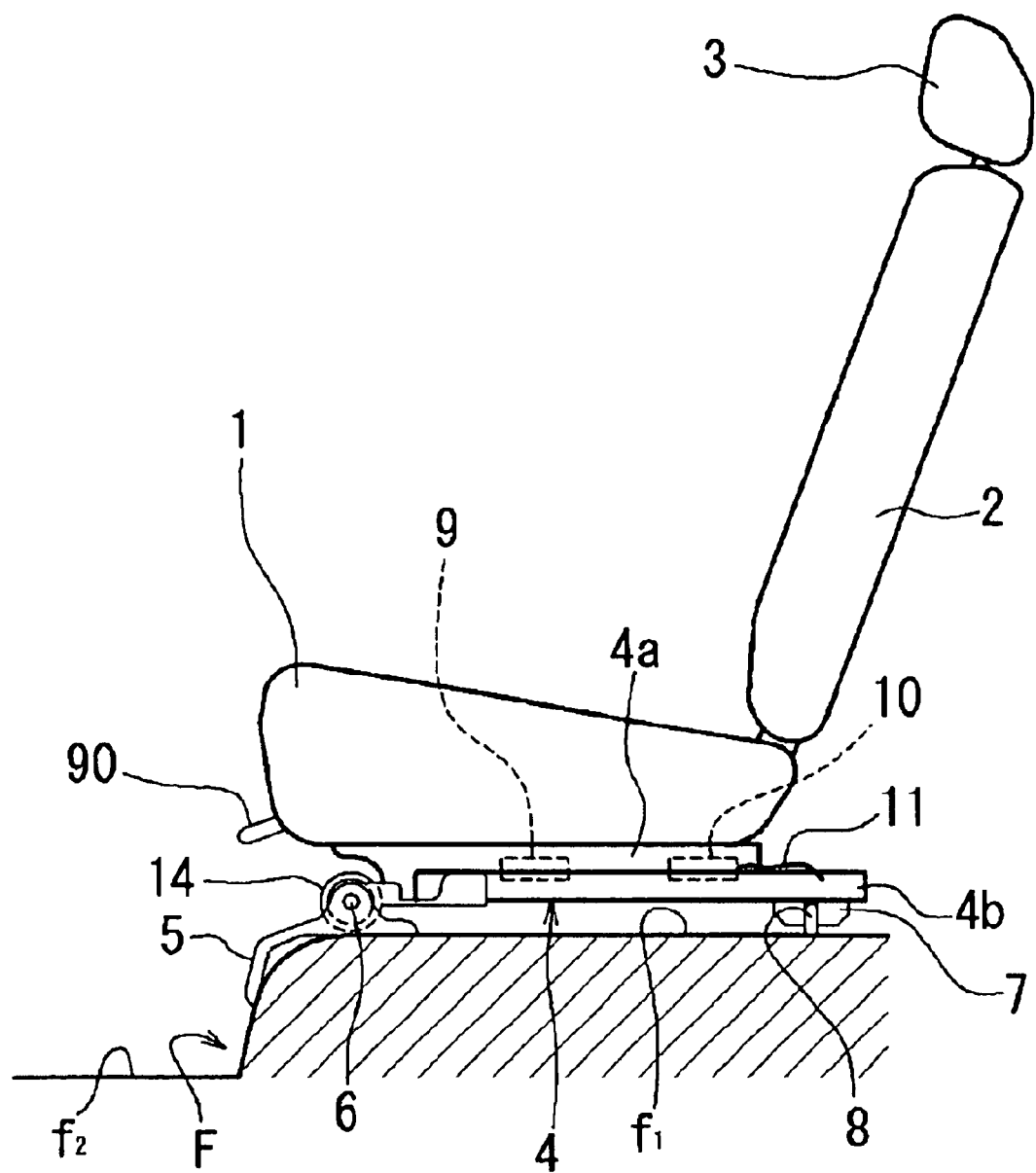
FIG. 1 is a side elevational view schematically showing a structure of a slide type foldable seat capable of being kicked up in accordance with the present invention.

A description will be given below with reference to the accompanying drawings. An illustrated embodiment is applied to a structure of a rear seat provided in a vehicle body floor F of a station wagon or the like in which a floor surface $f_1$ in a portion where the seat is placed is higher than a floor surface $f_2$ corresponding to a foot placing portion for passenger so as to be formed in an up floor shape as shown in FIG. 1.

The seat for a motor vehicle is constituted by a seat cushion 1, a seat back 2 standing up from the seat cushion 1 and a head rest 3 provided in an upper portion side of the seat back 2 in a standing manner, and is assembled in a reclining type capable of tilting up and down the seat back 2 to a front side and a rear side, by providing with a reclining mechanism (not shown) in a pivot portion between the seat cushion 1 and the seat back 2.

In addition to the reclining type, the seat is provided with a slide rail 4 assembled by an upper rail 4a mounted to a lower portion of the seat cushion 1 in a longitudinal direction, and a lower rail 4b slidably supporting the upper rail 4a, and a whole of the seat including from the seat cushion 1 to the seat back 2 is structured as a slide type seat capable of moving in the longitudinal direction within the vehicle by providing with the slide rail 4 in right and left sides (hereinafter, only one side is illustrated) of a lower portion in the seat cushion 1.

The slide rail 4 is structured such that a front end side of the lower rail 4b is axially supported and pivoted to a stand leg portion 5 placed in a portion close to a front portion of the floor surface $f_1$ by a supporting shaft 6, a striker lock 7 is provided in a lower portion close to a rear end of the lower rail 4b, and a rear end side of the lower rail 4b is retained and mounted to a striker 8 standing up from the floor surface $f_1$ by the striker lock 7, whereby the slide rail 4 is placed on the floor surface $f_1$ of the vehicle body floor F built on top of the lower rail 4b.

Figure 2:
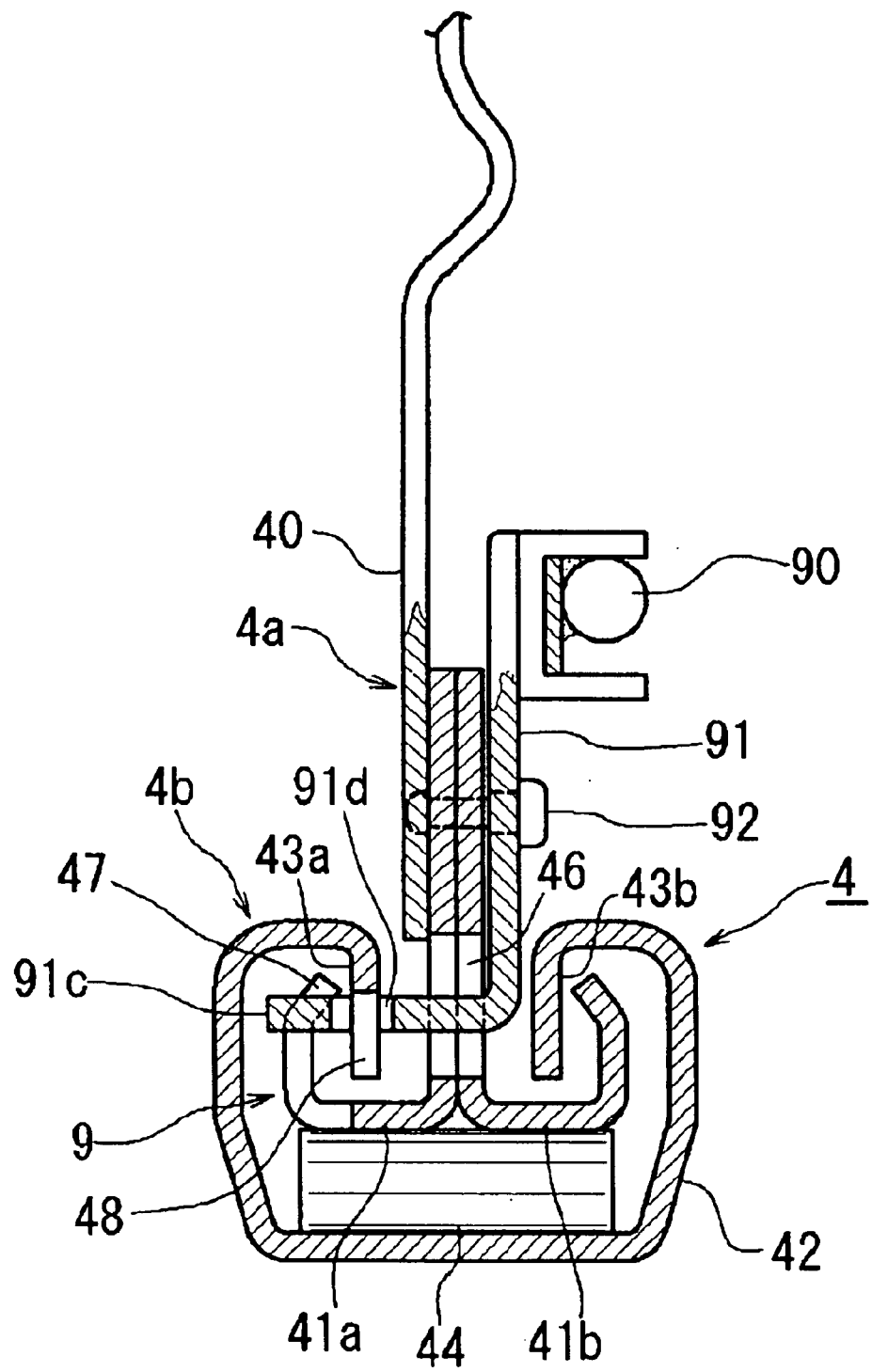
FIG. 2 is a horizontal cross sectional view showing a slide rail provided in the seat shown in FIG. 1.

The upper rail 4a is constituted by a central standing frame 40 and substantially J-shaped slide base portions 41a and 41b fixed to each other in a back to back manner, as shown in FIG. 2, and both elements are integrally assembled by relatively fixing a lower portion side of the standing frame 40 and upper portion sides of the slide base portions 41a and 41b to each other. The lower rail 4b is formed by a rail base frame 42 formed in an upward C shape, and substantially reverse-L shaped inward bent flanges 43a and 43b bent to an inner side with keeping a relative interval from both upper end lines of the rail base frame 42.

The upper rail 4a is structured such that the central standing frame 40 is arranged so as to stand to an upper side rather than the relative interval between the inward bent flanges 43a and 43b from the upper sides of the slide base portions 41a and 41b, downward curved portions of the slide base portions 41a and 41b are assembled in inner sides of the inward bent flanges 43a and 43b, and a plurality of rollers 44 are provided in the lower portion sides of the slide base portions 41a and 41b, whereby the upper rail 4a is supported so as to be freely slid by the lower rail 4b.

Figure 3:
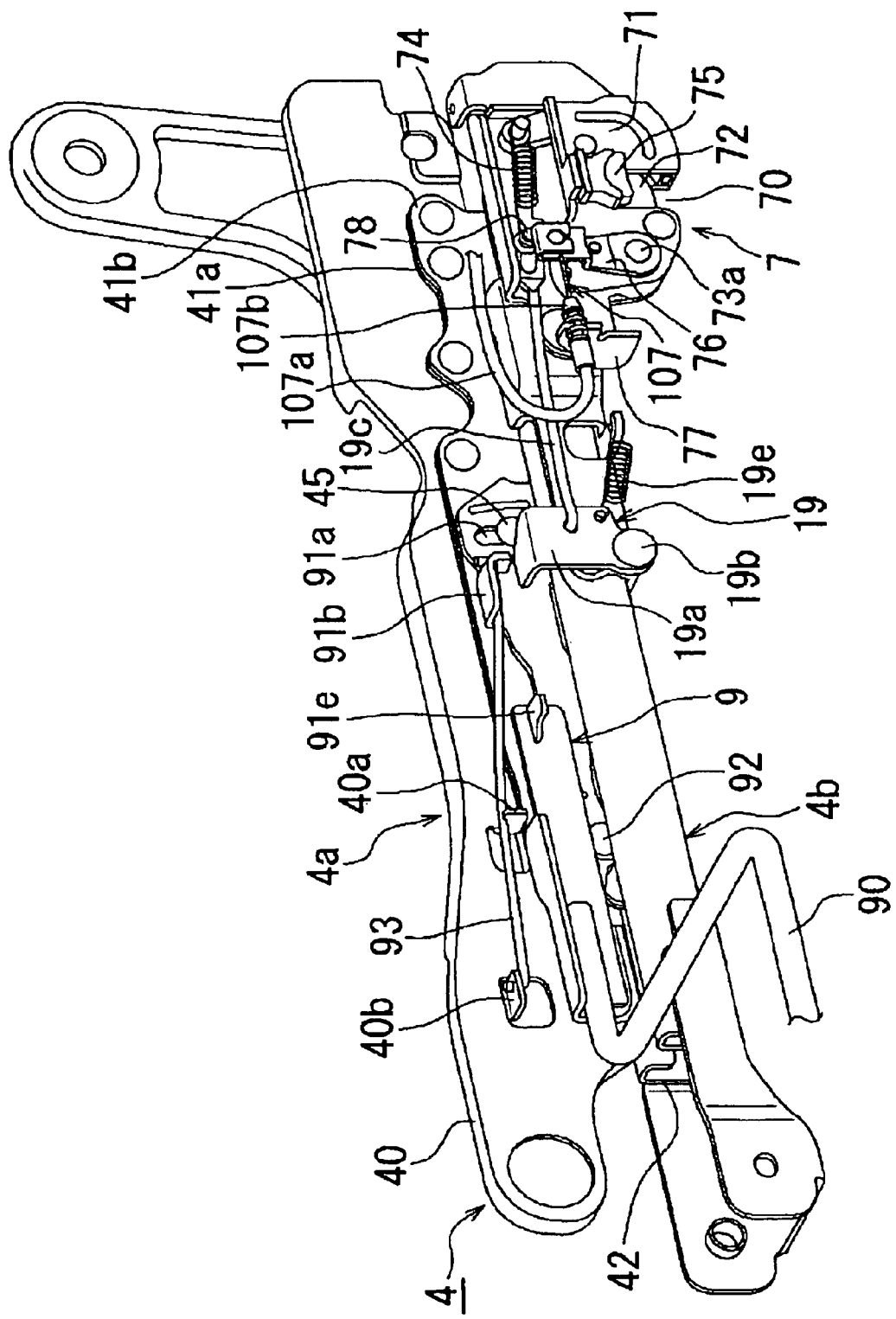
FIG. 3 is a perspective view showing a complete structure of a slide rail including a slide lock, a striker and a stopper mechanism of the slide lock which are provided in the seat shown in FIG. 1.

A slide lock 9 is provided in the slide rail 4 as shown in FIG. 3. The slide lock 9 is assembled so as to be provided with an operation lever 90 extended between the right and left slide rails 4 in the lower portion of the front side in the seat cushion 1, and a lock plate 91 positioned at each of side portions in the upper rails 4a. The operation lever 90 is integrally provided with the respective lock plates 91 by welding and fixing both shaft ends to the right and left (only one side is illustrated) lock plates 91.

The lock plate 91 is positioned along the longitudinal direction of the upper rail 4a, and is mounted so as to freely swing upward and downward around a supporting shaft 92 corresponding to a supporting point by axially supporting a portion close to a front end by the supporting shaft 92 inserted and fixed to plate surfaces of the slide base portions 41a and 41b. Further, a semicircular arc-shaped long hole 91a around the supporting shaft 92 is provided in a plate surface of the lock plate 91, and a guide pin 45 protruding out from a plate surface close to the upper sides of the slide base portions 43a and 43b is inserted to the long hole 91a, whereby the lock plate 91 is mounted so as to be freely swung and guided.

The lock plate 91 is mounted so that a portion close to the rear end is always energized by a rod-shaped spring 93 around the supporting shaft 92 corresponding to the supporting point. The rod-shaped spring 93 is provided by receiving a substantially middle line of an axis by a protruding piece 40a cut and bent from a plate surface of the standing frame 40, and extending respective front and rear axial ends between an axial stop piece 40b cut and bent from the standing frame 40 and an axial stop piece 91b bent from an upper end edge of the lock plate 91.

Figure 4:
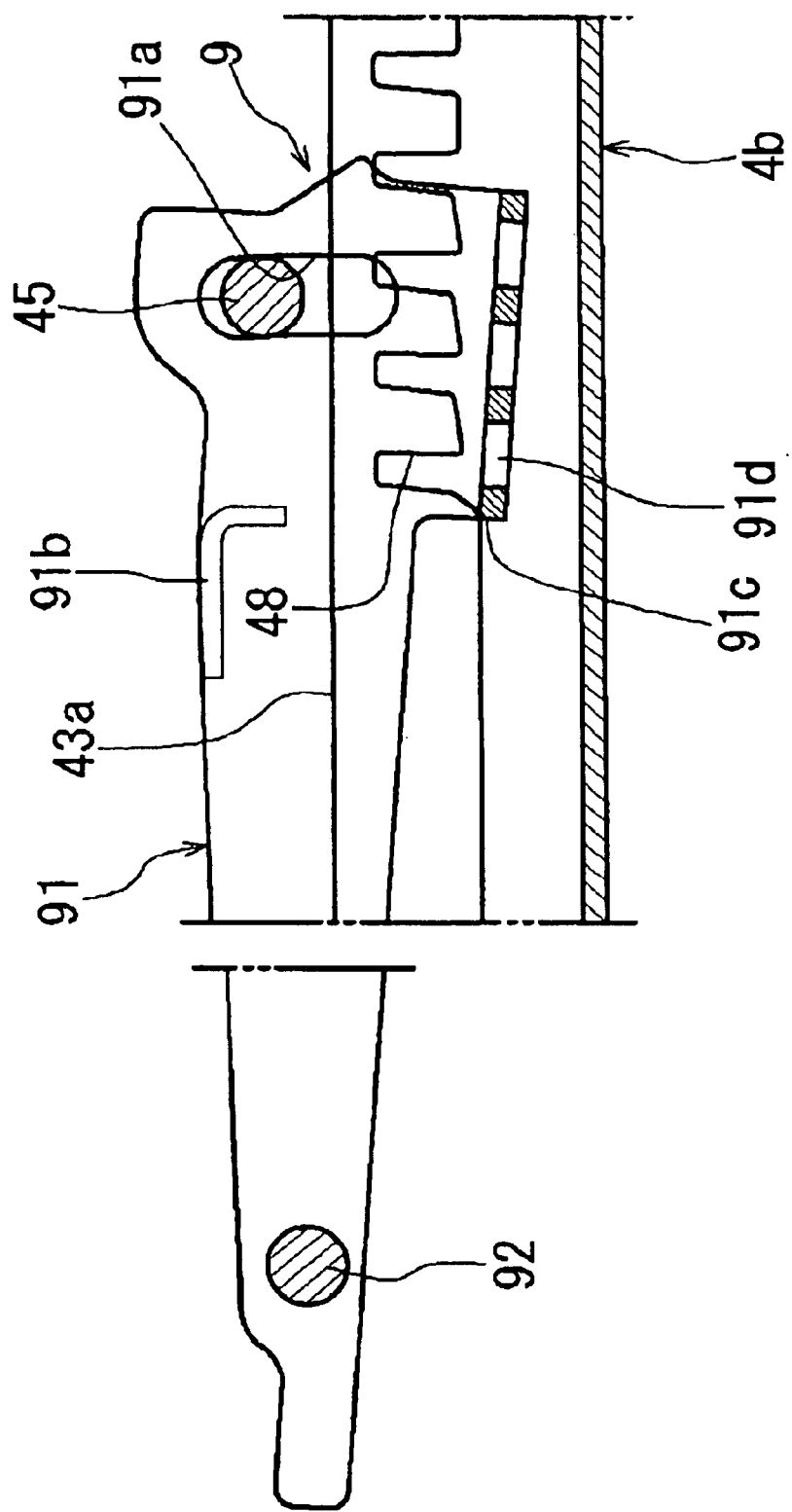
FIG. 4 is a side elevational view showing the slide lock provided in the slide rail shown in FIG. 2 in an unlocked state.

The lock plate 91 has a retainer piece 91c protruding to a side portion from a lower end edge as shown in FIGS. 2 and 4, is provided with a plurality of receiving holes 91d on a plate surface of the retainer piece 91c, and is mounted so as to protrude the retainer piece 91c from a slit 46 formed in a longitudinal direction of the base portions 41a and 41b to a lower side of the inward bent flange 43a and a notch 47 of the slide base portion 41a. With respect to the lock plate 91, a plurality of protruding teeth 48 engaging with the receiving holes 91d of the retainer piece 91c are provided in the lower rail 4b by notching the lower end line of the inward bent flange 41a in a concavo convex shape toward the longitudinal direction.

Since a plurality of protruding teeth 48 and the receiving holes 91d of the retainer piece 91c are engaged with each other, the slide lock 9 locks the upper rail 4a so that the upper rail 4a can not be slide by the lower rail 4b, and the structure is made such that the slide lock is unlocked because the rear end side of the lock plate 91 swings downward around the supporting shaft 92 corresponding to the supporting point against the spring 93 by pulling down the operation lever 90. In addition, a stopper piece 91e restricting a bottom dead point at a time of swinging is provided in the lock plate 91 so as to be brought into contact with the lower rail 4b.

Figure 5:
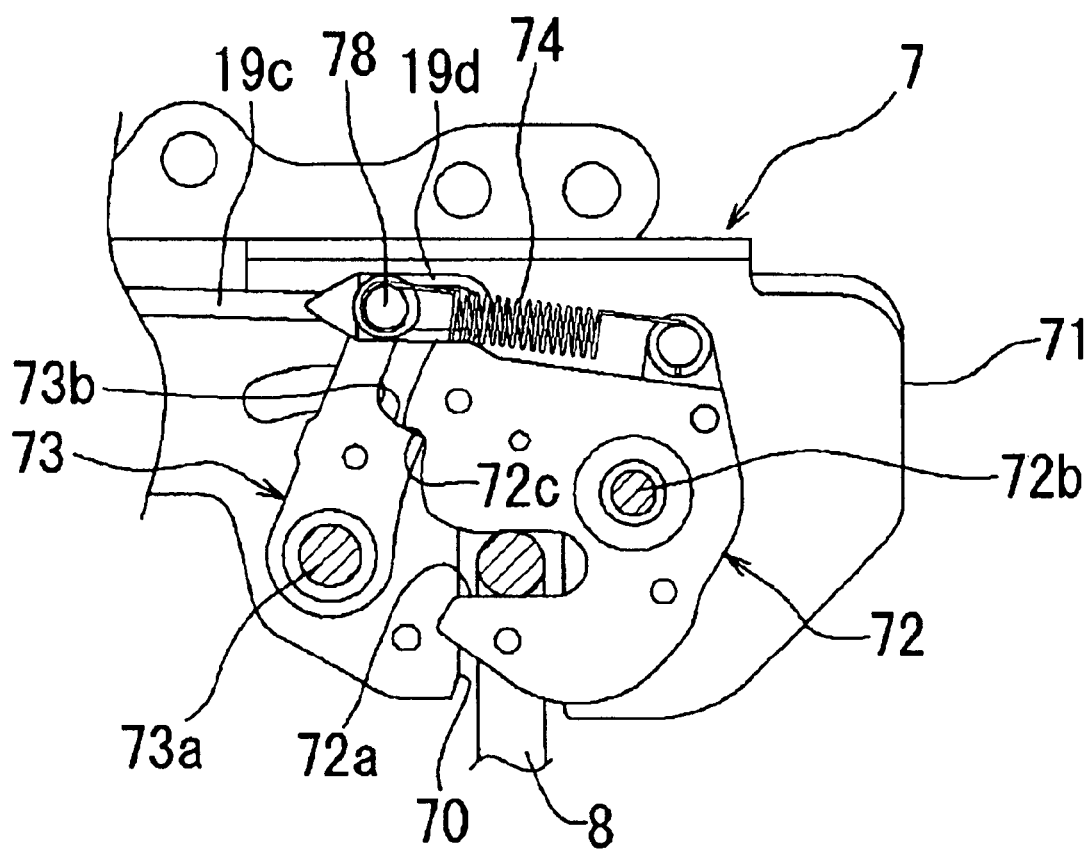
FIG. 5 is a side cross sectional view showing a striker lock provided in the slide rail shown in FIG. 3 in a locked state.

The striker lock 7 is assembled by axially supporting and pivoting a hook-shaped latch 72 having a receiving jaw 72a gripping the striker 8 as shown in FIG. 5, and a cam-shaped ratchet 73 locking the latch 72 within an interval of the side plate 71 by supporting shafts 72b and 73a, built on top of two opposing side plates 71 provided with a downward U-shaped receiving port 70 receiving the striker (not shown) as shown in FIG. 3. The striker lock 7 is assembled so that the striker lock 7 can lock and unlock with respect to the striker 8 since a retainer projection 72c is provided in the latch 72 and a receiving projection 73b is provided in the ratchet 73 so as to be engaged with and disengaged from each other.

The latch 72 is energized by a torsion coil spring (not shown) provided on an axis of the supporting shaft 72a in both of a gripping direction and disengaging direction of the striker 8. Further, the ratchet 73 is tensioned by a coil spring 74 extended with respect to the latch 72 in a direction of engaging with the latch 72. In addition, a damping pad 75 at a time of gripping the striker 8 is mounted and fixed to an outer side of the side plate 71 in a back side of the receiving port 70 as shown in FIG. 3. Further, a swinging piece 76 connecting a wire end of a traction wire mentioned below is mounted on the same axis as the supporting axis 73a axially supporting the ratchet (not shown).

Figure 6:
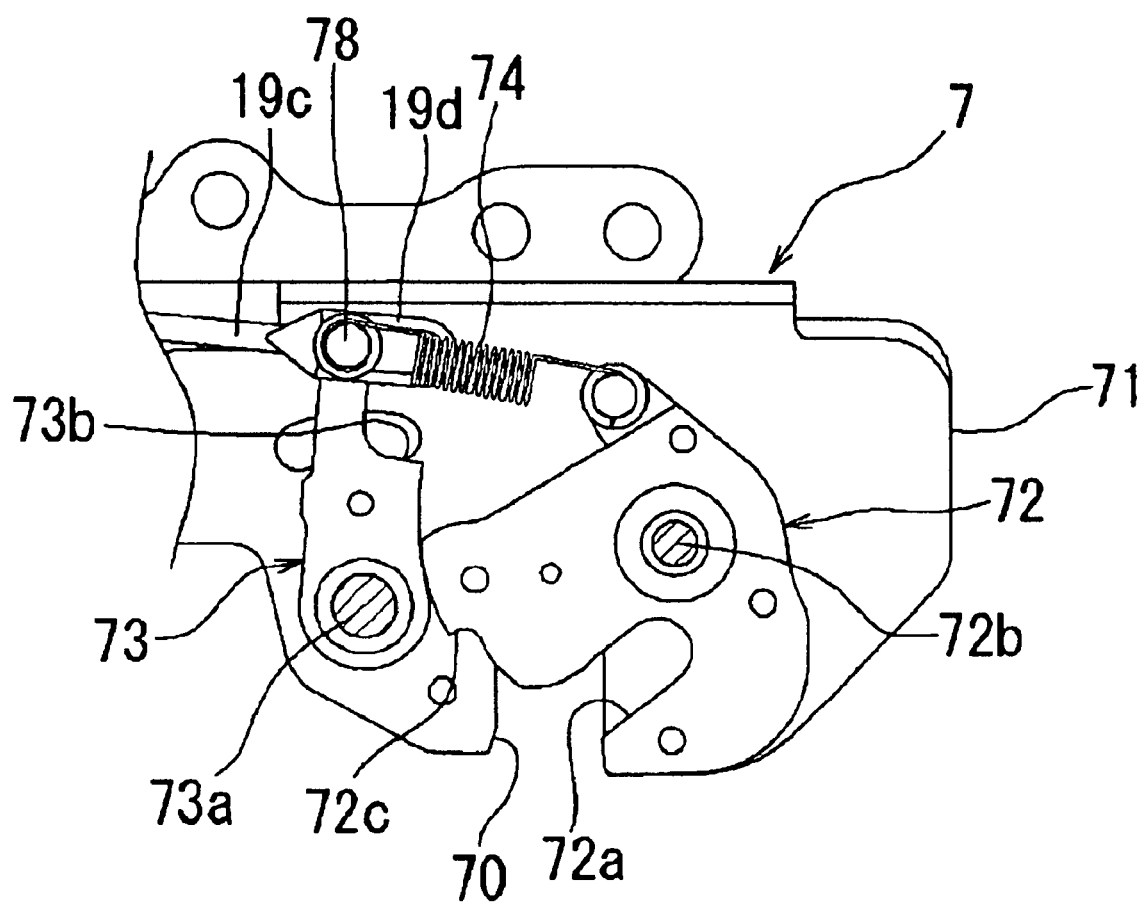
FIG. 6 is a side cross sectional view showing the striker lock shown in FIG. 5 in an unlocked state.

When pulling the ratchet 73 against the coil spring 74 in accordance with a lever operation mentioned below as shown in FIG. 6, the ratchet 73 swings around the supporting shaft 73a, the receiving projection 73b of the ratchet 73 comes off from the retainer projection 72c of the latch 72 and the latch 72 swings in the disengaging direction from the striker 8 around the supporting shaft 72b by the coil spring accompanying with the kick-up operation of the seat, whereby the striker lock 7 executes an unlocking operation.

When the striker lock 7 is unlocked, the seat is kicked up from the rear portion side to the upper side in the folded state of the seat back 2 around the supporting shaft 6 (refer to FIG. 1) axially supporting and pivoting the front end side of the lower rail 4b. In the striker lock 7 after being operated, one jaw of the latch 72 is brought into contact with the side portion of the ratchet 73, and the latch 72 is biased by the coil spring in the unlocking direction, is supported in a tensile manner by the coil spring 74 extended between the latch 72 and the ratchet 73, so that the ratchet 73 is kept in a state of being pressed and supported to a swinging position by the latch 72.

In this slide type seat, there is provided a switching mechanism 10 for switching so that when keeping the seat at the sitting position in the front side within the vehicle, the unlocking operation of the striker lock 7 can not be executed by the operation lever mentioned below, and when moving the seat to a predetermined rear position, the unlocking operation of the striker lock 7 can be executed by the operation lever. The switching mechanism 10 is mounted to a portion close to a rear side in the lower portion of the seat cushion 1 so as to be operated by lever from the rear portion side of the seat.

Figure 7:
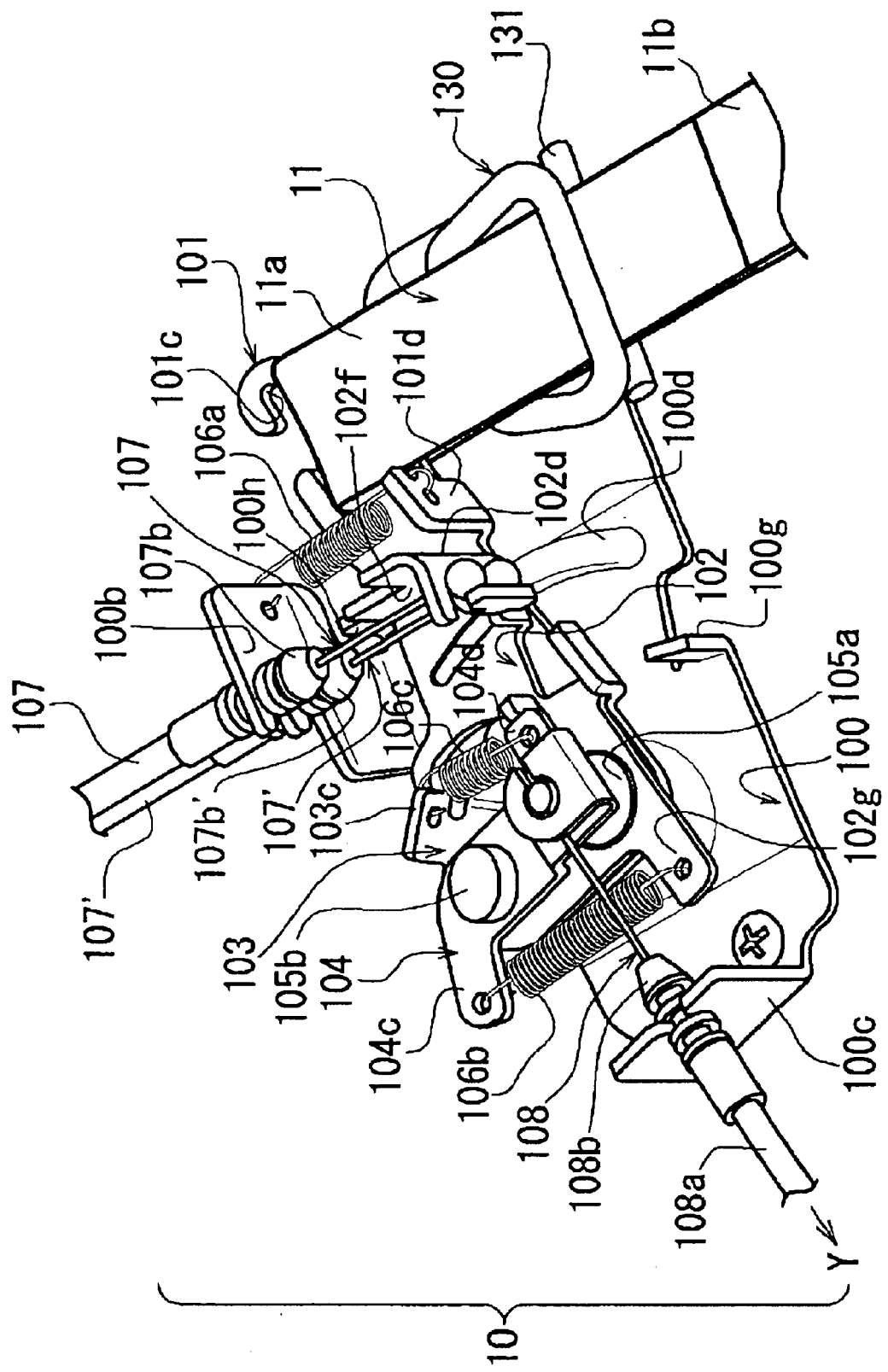
FIG. 7 is a perspective view showing a complete structure of a switching mechanism provided in a lower portion of a seat cushion shown in FIG. 1.
Figure 8:
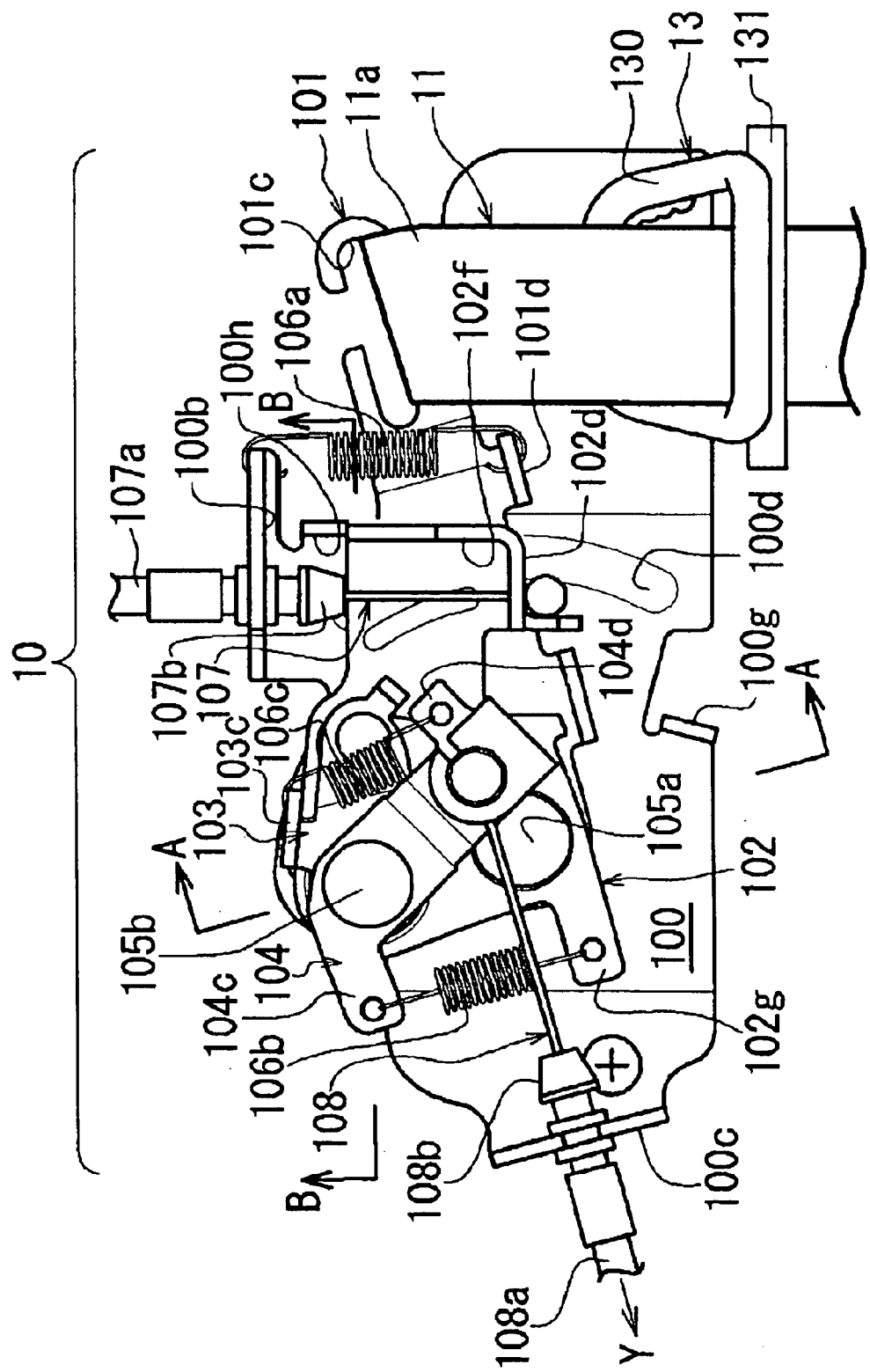
FIG. 8 is a plan view showing the switching mechanism shown in FIG. 7.

The switching mechanism 10 is structured such that a placing plate 100 corresponding to a base element mounted to and fixed to the lower portion side of the seat cushion, and four rotary plates 101 to 104 are combined as shown in FIGS. 7 and 8, is provided with the strap 11 so as to be connected to a first rotary plate 100 corresponding to the operation lever, and is provided in the portion close to the rear side in the lower portion of the seat cushion so as to be operated from the seat rear portion side in accordance with the pulling operation by the strap 11.

Figure 9:
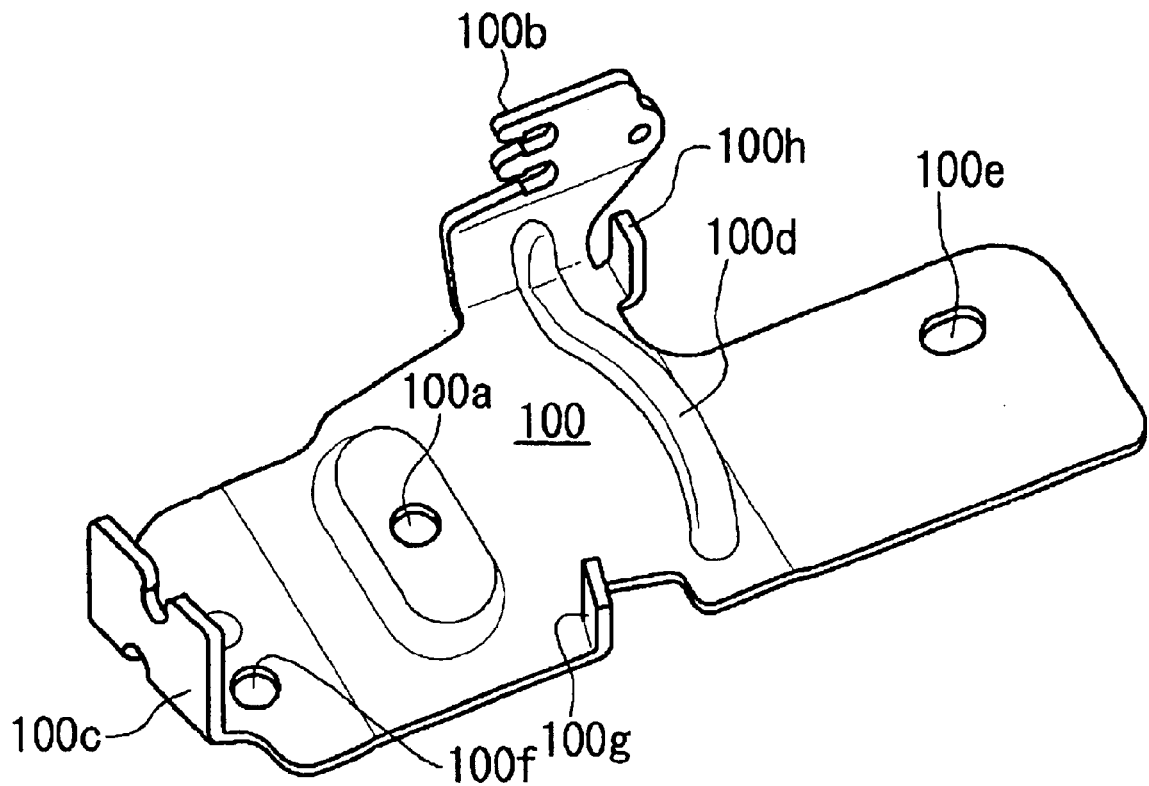
FIG. 9 is a perspective view showing a placing plate constituting the switching mechanism shown in FIG. 7.

A description will be given independently of each of the constituting elements 100 to 104 with reference to FIGS. 9 to 13 (in this case, since the relevant members are not illustrated, reference numerals are not attached thereto in the description). A stop hole 100a holding a first supporting shaft in a standing manner is provided in the placing plate 100 so as to be opened at a predetermined position on a plate surface upraised in an oval shape as shown in FIG. 9. Further, a retainer piece 100b retaining two first traction wires in cable heads of wire cables, and a retainer piece 100c retaining one second traction wire in a cable head of a wire cable are provided by being stood from edge lines which are apart from each other. In addition, a bead-shaped embossed protrusion 100d sliding and guiding the first rotary plate and reinforcing a standing base portion of a retainer piece 102, and screw fastening holes 100e and 100f fixing the placing plate itself to the lower portion of the seat cushion are provided on a plate surface in the placing plate 100. Further, a stopper piece 100g restricting a stop position of the first rotary plate is provided by being stood up at a middle position of the edge line, and a stopper piece 100h restricting a return position of the first rotary plate is provided by being stood up at a position close to the retainer piece 100b, respectively.

Figure 10:
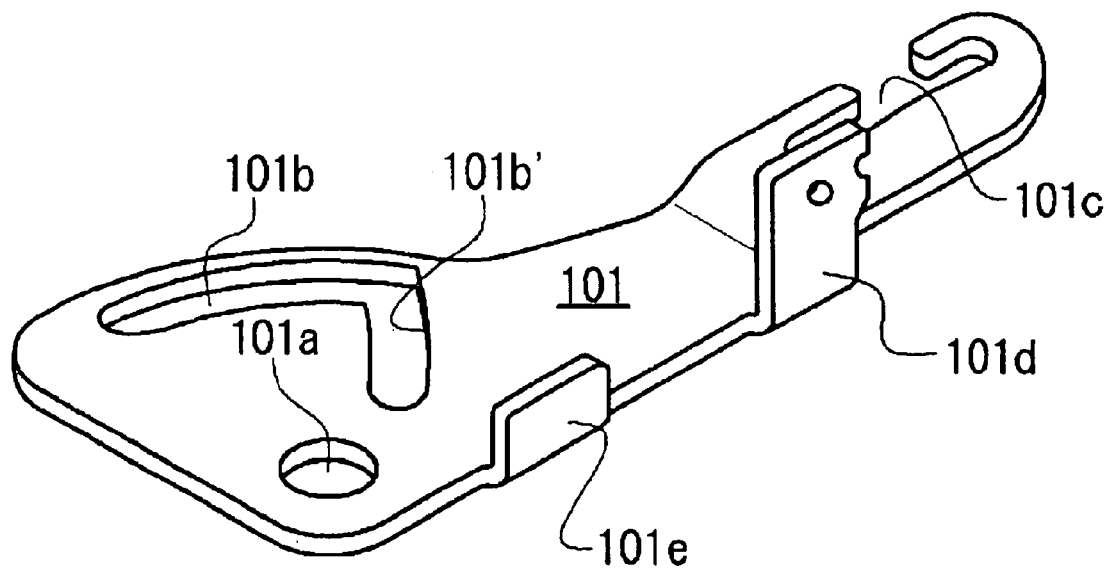
FIG. 10 is a perspective view showing a first rotary plate constituting the switching mechanism shown in FIG. 7.

A through hole 101a inserting the first supporting shaft stood up from the placing plate thereto, substantially L-shaped guide holes 101b and 101b' formed by continuously connecting a first circular arc portion 101b around the first supporting shaft to a second circular arc portion 101b' around the second supporting shaft in different directions, and a slit-shaped receiving port 101c to which the strap is retained are provided on a plate surface of the first rotary plate 101 corresponding to the operation lever, as shown in FIG. 10. In addition, there are provided with a retainer piece 101d for the return coil spring which is provided with respect to the retainer piece of the placing plate, and a locking piece 101e brought into contact with the stopper piece of the placing plate.

Figure 11:
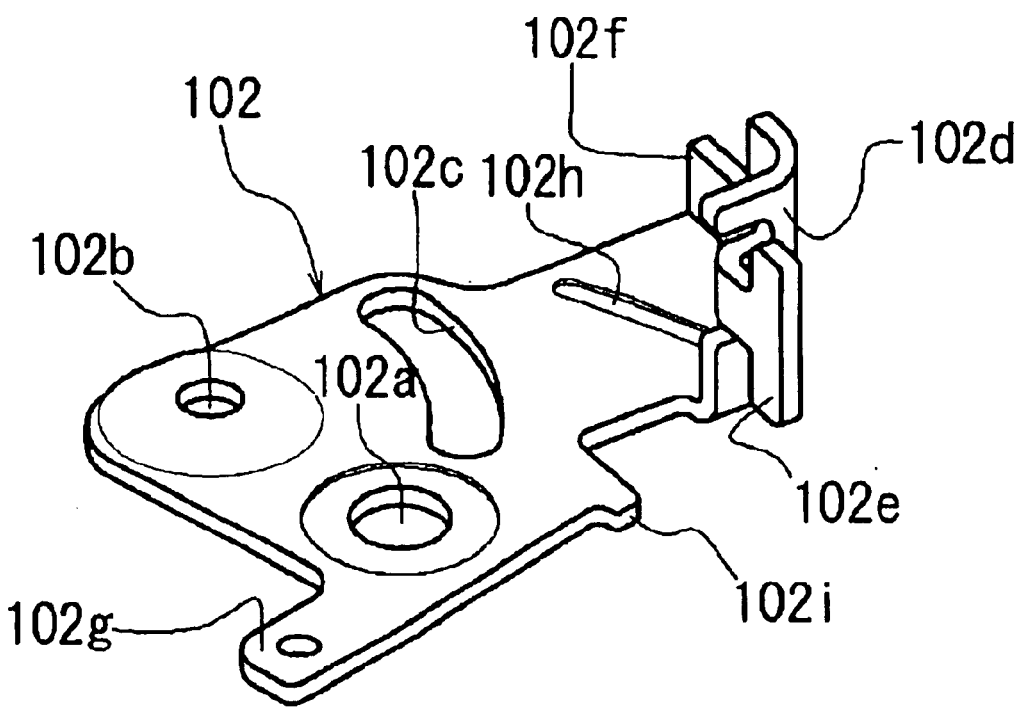
FIG. 11 is a perspective view showing a second rotary plate constituting the switching mechanism shown in FIG. 7.

An axial stop hole 102a receiving the first supporting shaft, and a stop hole 102b holding the second supporting shaft in a standing manner are provided at positions apart from each other in the second rotary plate 102, as shown in FIG. 11. A circular arc-shaped guide hole 102c inserting a slide pin protruding from a third rotary plate is provided on a plate surface. The circular arc-shaped guide hole 102c is formed so as to have the same hole end edge and base point as those of the second circular arc portion in the substantially L-shaped guide hole provided in the first rotary plate and extend to a middle point of the substantially L-shaped guide hole provided in the first rotary plate. In addition, a retainer piece 102d connecting the first traction wires in the respective wire ends is provided in the second rotary plate 102 by integrally bending a locking piece 102e for preventing the wire from coming off and a reinforcing rib 102f. Further, there are provided a retainer piece 102g hooking a return coil spring of a fourth rotary plate, a circular arc-shaped embossed protrusion 102h (in this case, it appears in a recess groove shape) keeping a slide interval with respect to the first rotary plate, and a protruding piece 102i brought into contact with the standing piece of the first rotary plate from an inner side.

Figure 12:
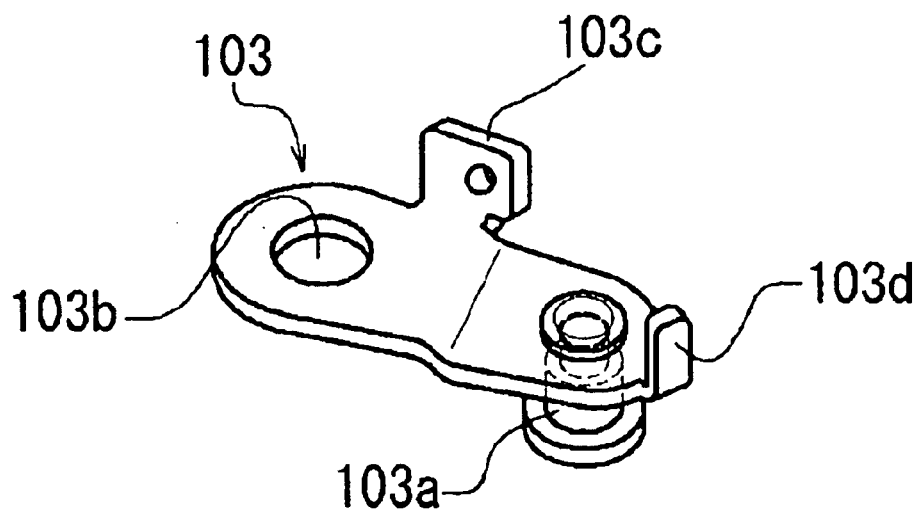
FIG. 12 is a perspective view showing a third rotary plate constituting the switching mechanism shown in FIG. 7.

A slide pin 103a inserted from the circular arc-shaped guide hole provided in the second rotary plate into the middle point within the substantially L-shaped guide hole provided in the first rotary plate is fixed to a third rotary plate 103 so as to be stood toward a lower side as shown in FIG. 12. Further, there are provided a through hole 103b inserting the second supporting shaft standing up from the second rotary plate thereto, a retainer piece 103c for a tension coil spring extended with respect to the fourth rotary plate, and a stopper piece 103d brought into contact with the fourth rotary plate so as to restrict a rotational position.

Figure 13:
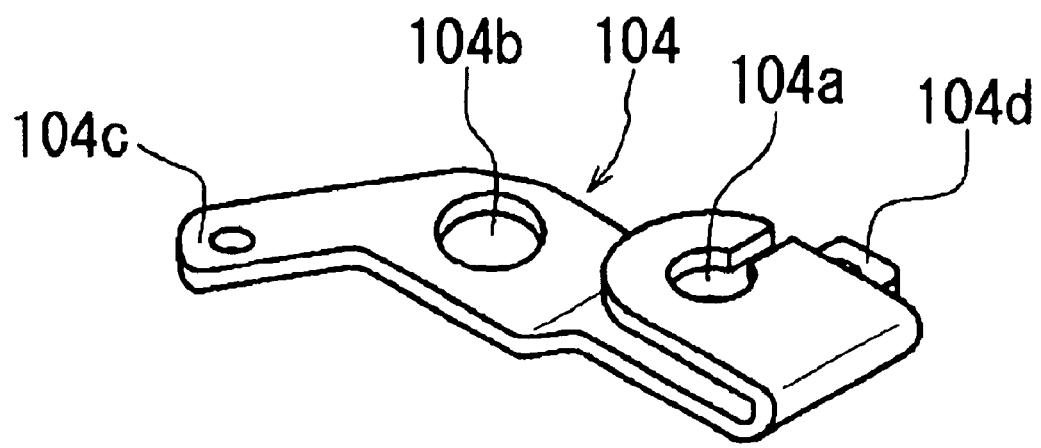
FIG. 13 is a perspective view showing a fourth rotary plate constituting the switching mechanism shown in FIG. 7.

A receiving port 104a connecting and fixing the second traction wire in a stop pin of a wire end, and an axial stop hole 104b receiving the second supporting shaft are provided in the fourth rotary plate 104 as shown in FIG. 13. Further, there are provided a retainer piece 104c for the return coil spring extended with respect to the second rotary plate, and a retainer piece 104d for the tension coil spring extended with respect to the third rotary plate.

Figure 14:
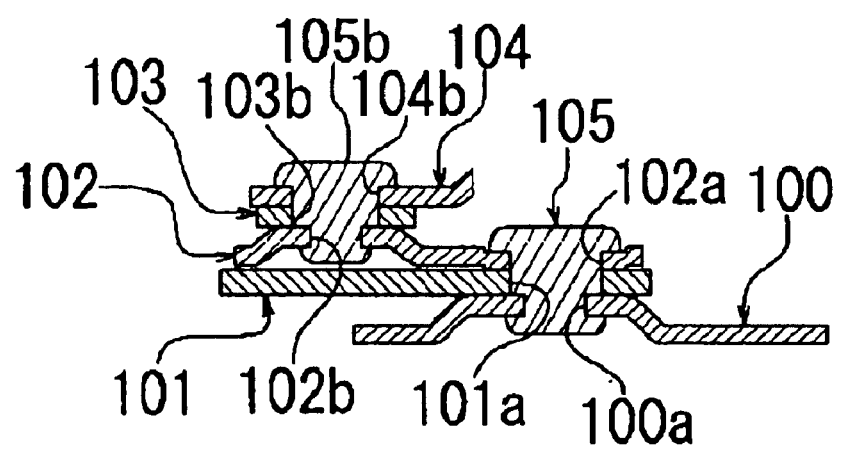
FIG. 14 is a cross sectional view showing the switching mechanism shown in FIG. 7 along a line A—A in FIG. 8.
Figure 15:
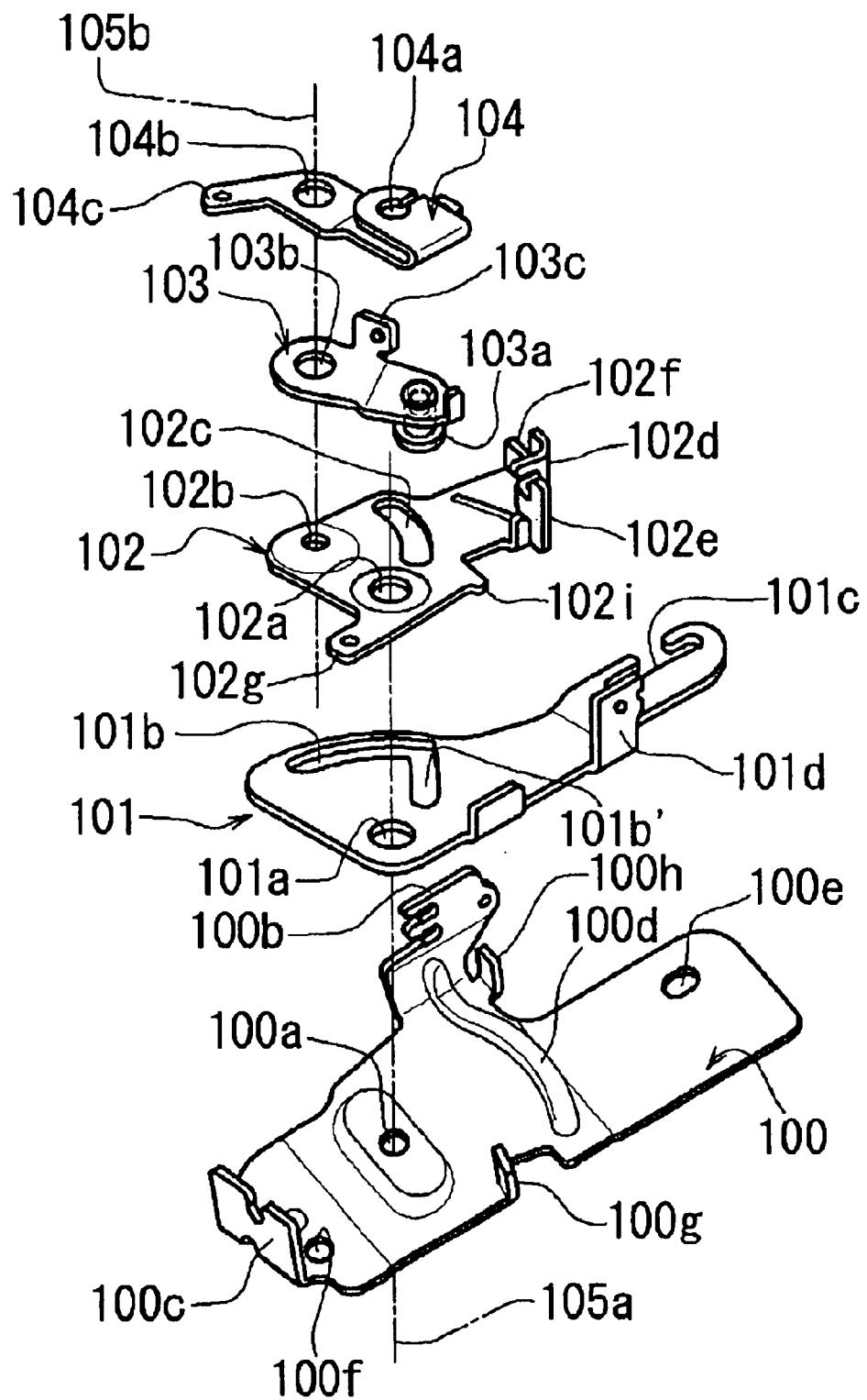
FIG. 15 is an expansion perspective view showing a relation of arrangement among the placing plate, the rotary plates and a supporting shaft shown in FIG. 14.

Among the constituting members 100 to 104, the placing plate 100, the first rotary plate 101 and the second rotary plate 102 are relatively arranged from a lower side to an upper side in this order as shown in FIGS. 14 and 15, and the first rotary plate 101 and the second rotary plate 102 are assembled so as to freely rotate in an upper side of the placing plate 100 by bearing and supporting the first rotary plate 101 and the second rotary plate 102 by a first supporting shaft 105a (refer to a one-dot chain line) inserted from the second rotary plate 102 to the first rotary plate 101 so as to be fixed to the placing plate 100 in a standing manner. Further, the second rotary plate 102, the third rotary plate 103 and the fourth rotary plate 104 are relatively arranged from the lower side to the upper side in this order, and the third rotary plate 103 and the fourth rotary plate 104 are assembled so as to freely rotate in an upper side of the second rotary plate 102 by bearing and supporting the third rotary plate 103 and the fourth rotary plate 104 by a second supporting shaft 105b (refer to a two-dot chain line) inserted from the fourth rotary plate 104 to the third rotary plate 103 so as to be fixed to the second rotary plate 102 in a standing manner.

Figure 16:
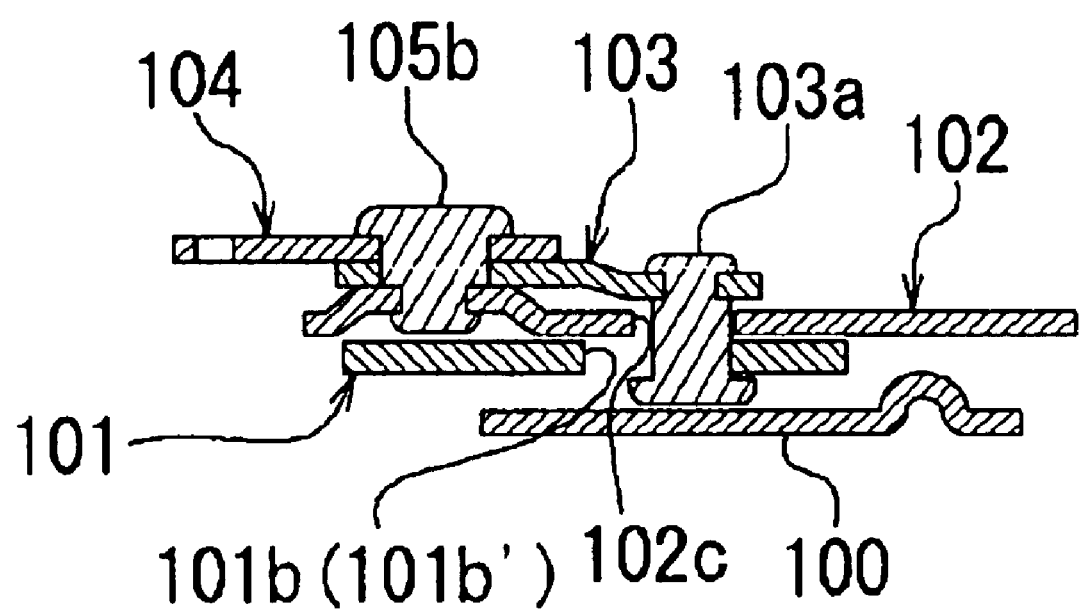
FIG. 16 is a cross sectional view showing the switching mechanism shown in FIG. 7 along a line B—B in FIG. 8.

The slide pin 103a protruding from the third rotary plate 103 is inserted and arranged so as to reach a middle point within the substantially L-shaped guide hole 101b and 101b' provided in the first rotary plate 101 from the circular arc-shaped guide hole 102c provided in the second rotary plate 102, as shown in FIG. 16. In accordance with this structure, the slide pin 103a is provided as a selecting member which selects whether the slide pin 103a is received in the circular arc portion 101b around the first supporting shaft 105a or it is inserted to the circular arc portion 101b' around the second supporting shaft 105b.

Among the constituting elements, a return coil spring 106a pulling the first rotary plate 101 is extended between the placing plate 100 and the first rotary plate 101 as shown in FIGS. 7 and 8. A return coil spring 106b pulling the fourth rotary plate 104 is extended between the second rotary plate 102 and the fourth rotary plate 104. A tension coil spring 106c pulling the third rotary plate 103 is extended between the third rotary plate 103 and the fourth rotary plate 104.

Figure 17:
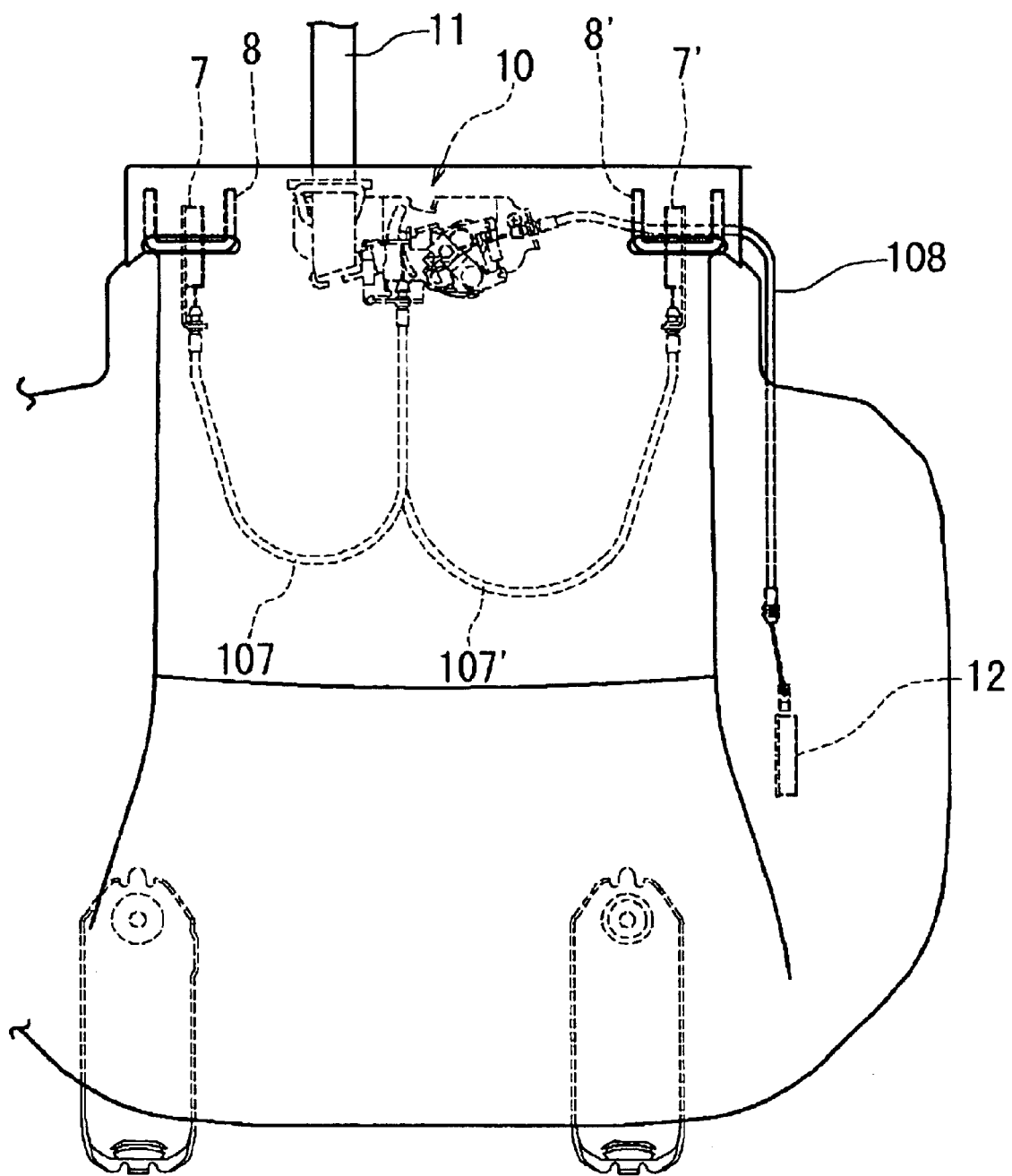
FIG. 17 is a plan view showing the seat cushion provided with the switching mechanism shown in FIG. 7 and a relevant mechanism.

First traction wires 107 and 107' connected to left and right strikers 7 and 7' are respectively drawn out from the switching mechanism 10 as shown in FIG. 17. The first traction wires 107 and 107' are connected to the striker locks 7 and 7' by engaging and fixing tube heads 107b and 107b' of wire tubes 107a and 107a' to the retainer piece 100b of the placing plate 100, fastening one wire end to the retainer piece 102d of the second rotary plate 102 as shown in FIGS. 7 and 8, engaging and fixing a tube head 107c to a retainer piece 77 protruding from the front edge of the side plate 71 as shown in FIG. 3 (only one side), and fastening another wire end to the swinging piece 76 having the same axis as the supporting shaft 73a or the ratchet (not shown).

In addition, as shown in FIGS. 7 and 8, a second traction wire 108 connected to the upper rail is drawn out from the switching mechanism 10. This second traction wire 108 is connected to the upper rail by engaging and fixing a tube head 108b of a wire tube 108a to the retainer piece 100c of the placing plate 100, fixing one wire end by a pin fitted to the receiving port 104a of the fourth rotary plate 104, and fastening another wire end to a wire pulling mechanism mentioned below.

Figure 18:
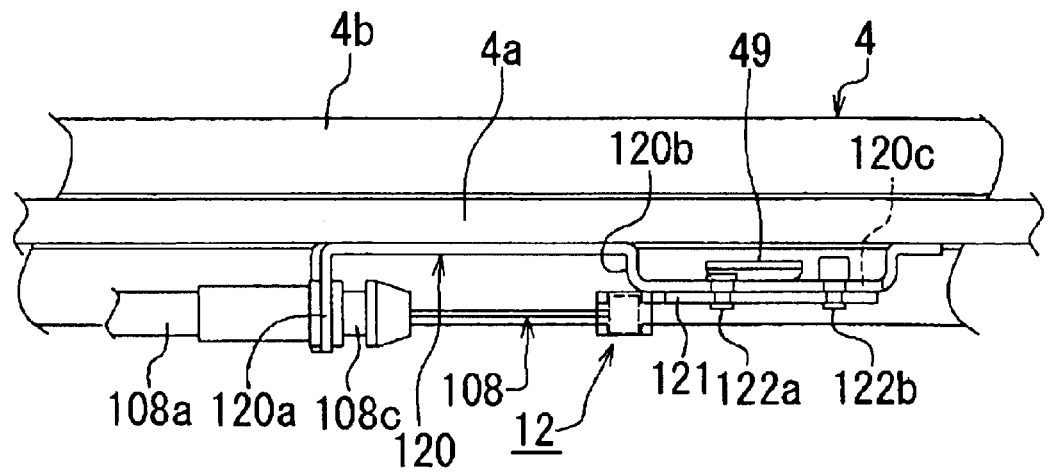
FIG. 18 is a plan view showing a wire pulling mechanism provided in the slide rail shown in FIG. 3.
Figure 19:
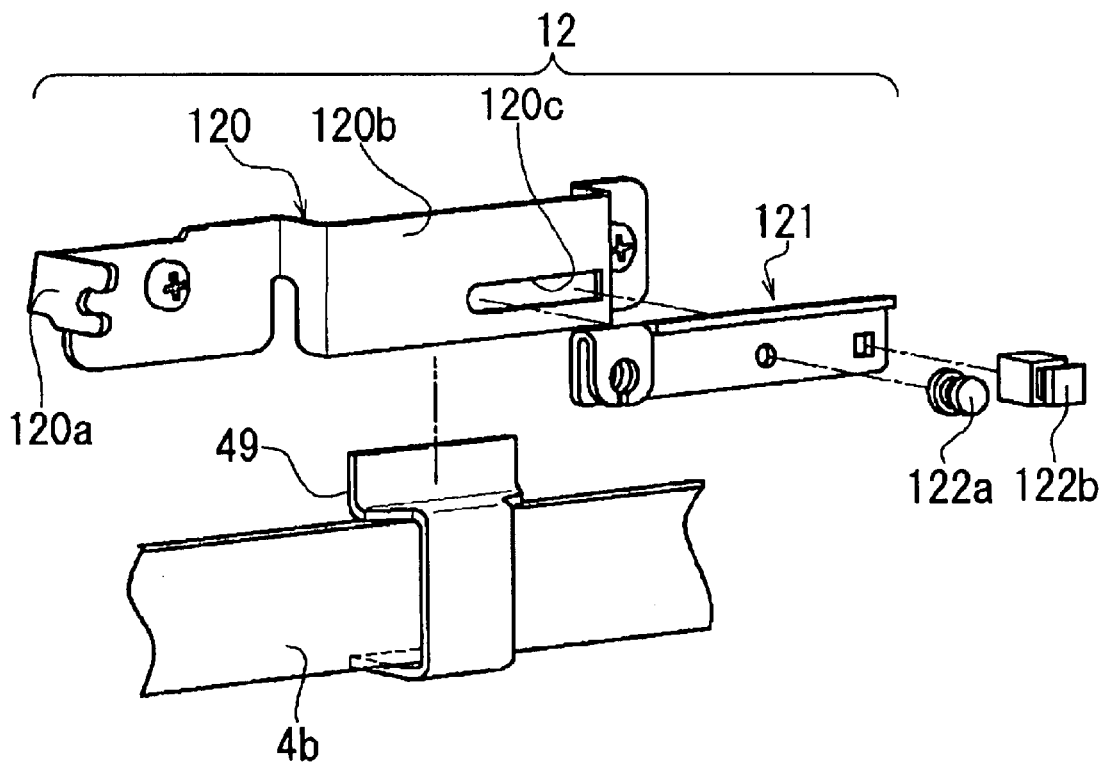
FIG. 19 is an expansion perspective view showing the wire pulling mechanism shown in FIG. 18.
Figure 20:
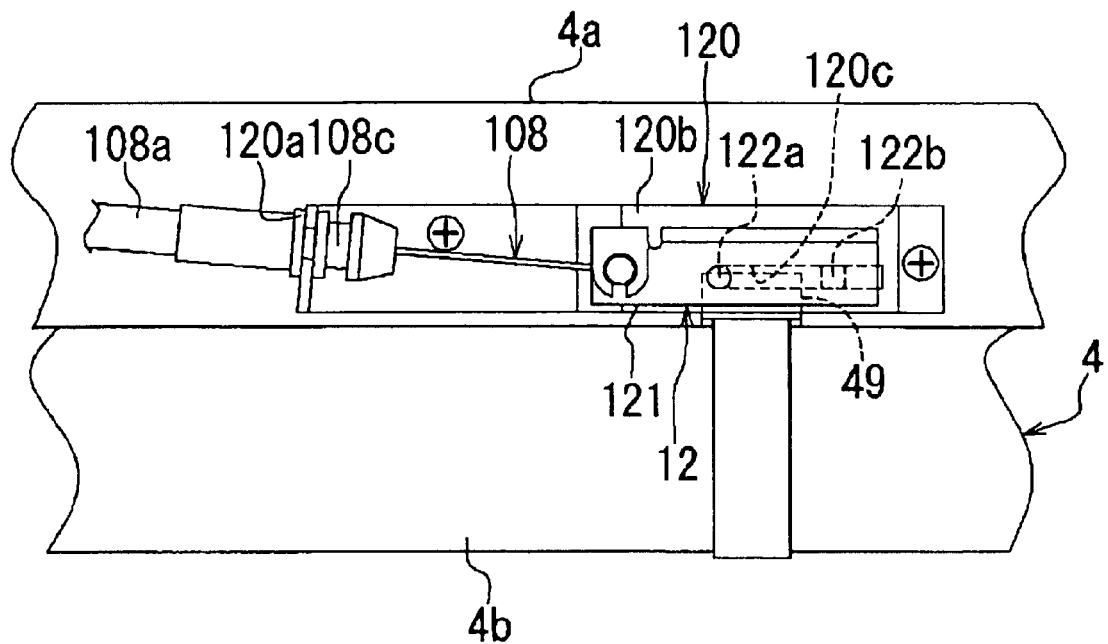
FIG. 20 is a side elevational view showing the wire pulling mechanism shown in FIG. 18.

The wire pulling mechanism 12 is provided with a C-shaped protruding plate 120b continuously formed from a retainer piece 120a engaging and fixing a tube head 108c of a wire tube 108a as shown in FIGS. 18 to 20, and is connected to the upper rail 4a by providing with a bracket plate 120 in which a long hole along a slide direction of the upper rail 4a is provided on a plate surface of the protruding plate 120b, and a slide plate 121 fixing the wire end of the second traction wire 108 by a stop pin.

The bracket plate 120 is mounted and fixed to the side portion of the upper rail 4a by being set and fixed in both sides of the protruding plate 120b. Further, the slide plate 121 is assembled by two supporting pins 122a and 122b fitted to the long hole 120c of the protruding plate 120 so as to move along the long hole 120c of the protruding plate 120b. Among the supporting pins 122a and 122b, one pin 122b employs a rectangular blocked pin. A stopper piece 49 standing up to an inner side of the protruding plate 120b from the lower rail 4b is provided so as to be brought into contact with the slide pin 122b.

Figure 21:
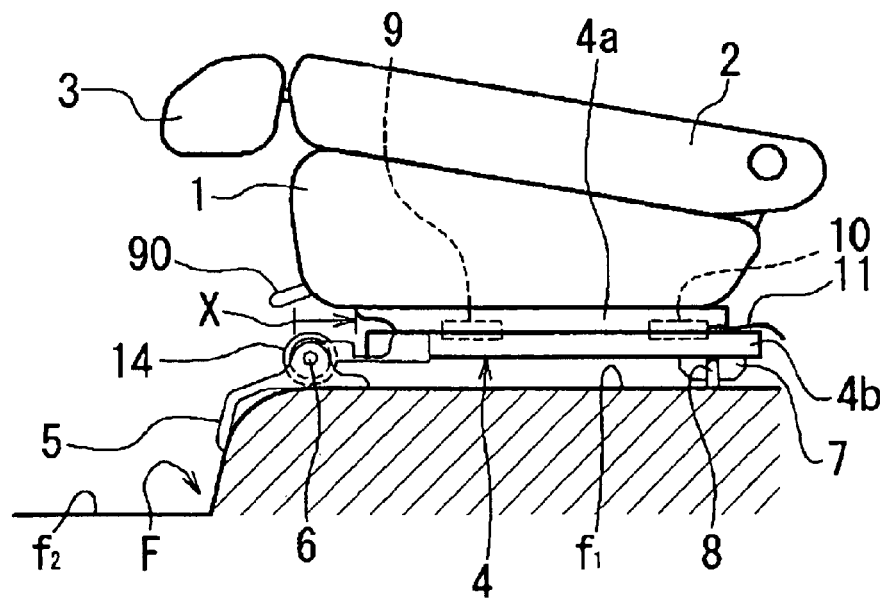
FIG. 21 is a side elevational view showing the seat shown in FIG. 1 in a state of being moved to a rear side within a vehicle and a folded state before being kicked up.

In the seat provided with the switching mechanism structured in this manner, at first, a description will be given of a case of sliding the whole of the seat in an X direction toward a rear side within the vehicle by the upper rail 4a in accordance with a normal operation procedure with reference to FIG. 21. At the beginning of the sliding operation, the wire pulling mechanism 12 moves together with the upper rail 4a including the wire tube 108a held by the retainer piece 120a of the bracket plate 120 without being pulled.

Figure 22:
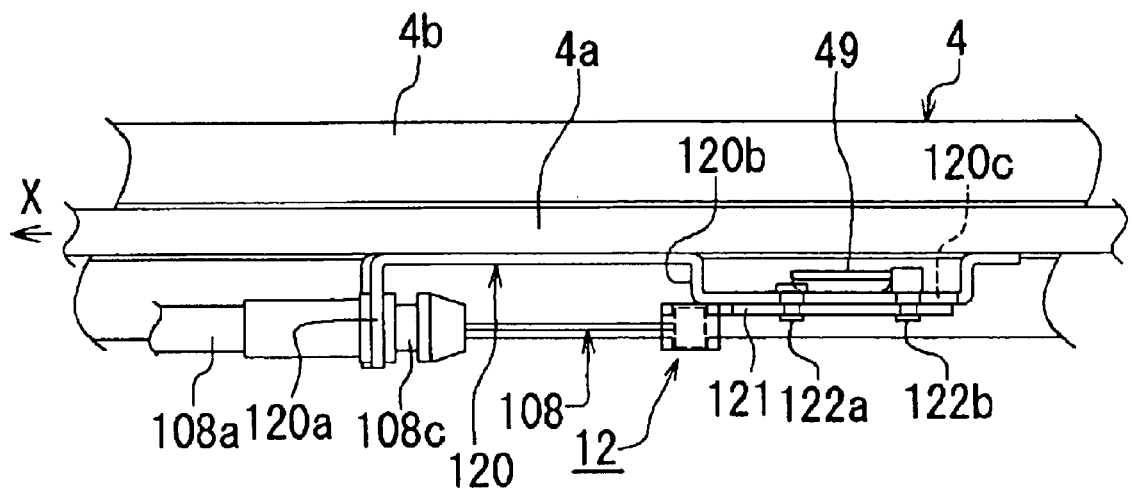
FIG. 22 is a schematic view of an operation showing the wire pulling mechanism shown in FIG. 18 at a position at which the slide rail is moving.
Figure 23:
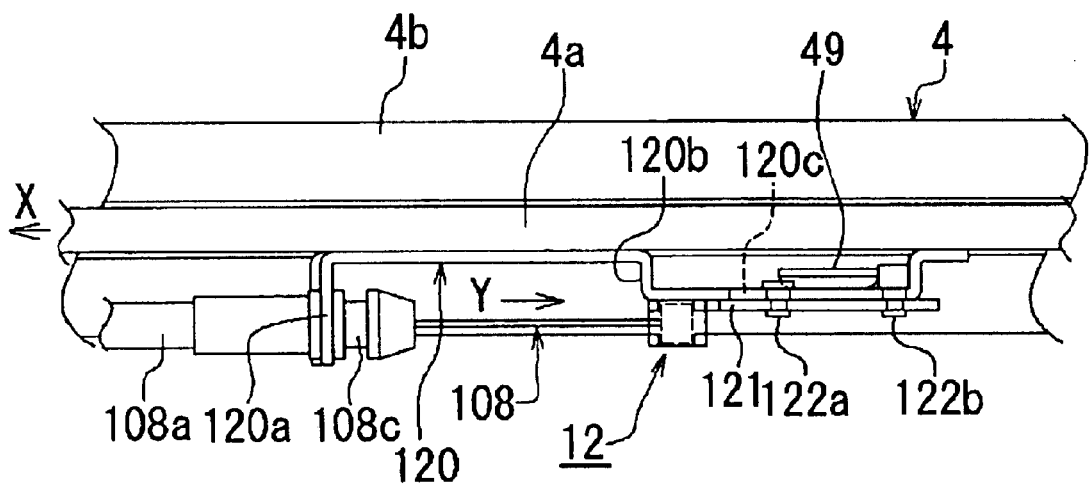
FIG. 23 is a schematic view of an operation showing the wire pulling mechanism shown in FIG. 18 at a position at which the slide rail moves to a rear side.

Immediately before the upper rail 4a moves to a rear most in the rear side within the vehicle, the slide pin 122b is brought into contact with the stopper piece 49 as shown in FIG. 22, whereby the slide plate 121 stops moving. Thereafter, since the bracket plate 120 follows to the movement of the upper rail 4a as shown in FIG. 23, the second traction wire 108 is pulled in a direction of an arrow Y in accordance that the upper rail 4a slides to a predetermined rear side position.

Figure 24:
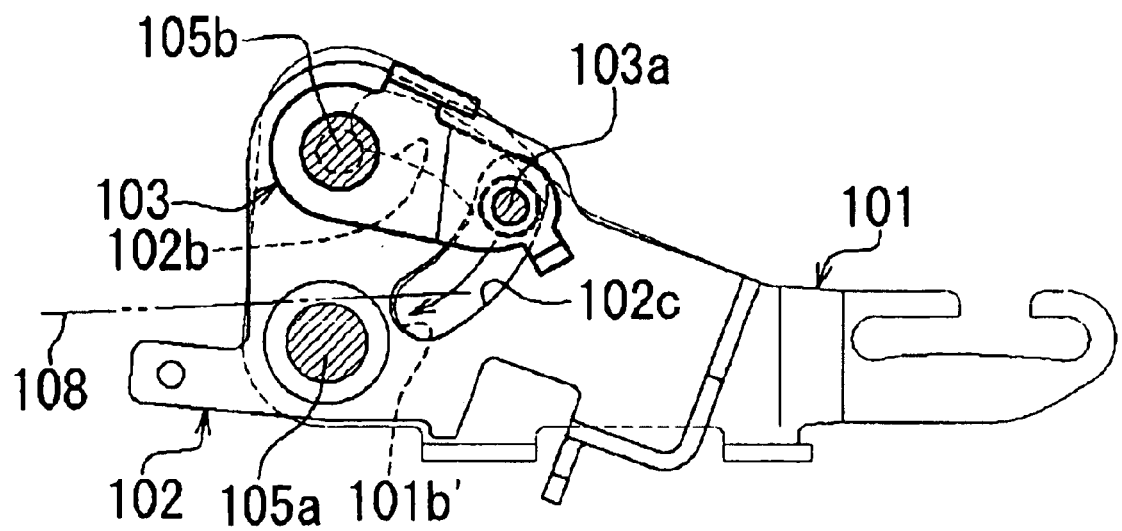
FIG. 24 is a schematic view showing the switching mechanism shown in FIG. 7 in a neutral state.
Figure 25:
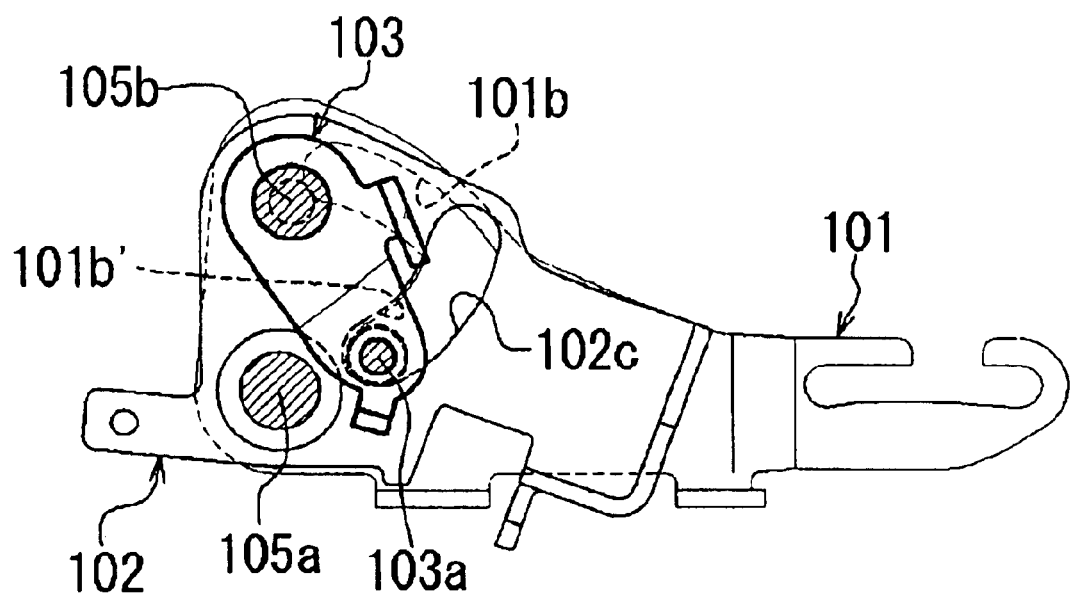
FIG. 25 is a schematic view of an operation showing the switching mechanism shown in FIG. 7 in a proper switched state.

Before the second traction wire 108 is pulled, the slide pin 103a is positioned at a middle position within the substantially L-shaped guide hole 101b and 101b' which is curved in the different directions as shown in FIG. 24. When the second traction wire 108 is pulled in the Y direction, the fourth rotary plate 104 swings and rotates around the second supporting shaft 105b due to the tension by the traction wire 108 as shown in FIG. 25, and the third rotary plate 103 provided with the slide pin 103a rotates around the second supporting shaft 105b via the tension coil spring 106c.

In accordance with the rotation of the third rotary plate 103, the slide pin 103a enters within the hole of the circular arc portion 101b' around the second supporting shaft 105b, and when the seat stops sliding at the rear most in the rear side within the vehicle, the pulling of the second traction wire 108 reaches the dead point. In this case, since the first traction wires 107 and 107' are connected to the second rotary plate 102 accompanying with the rotation of the third rotary plate 103, the second rotary plate 102 does not swing and rotate due to the spring force of the coil spring 106b extended between the fourth rotary plate 104 and the second rotary plate 102.

Figure 26:
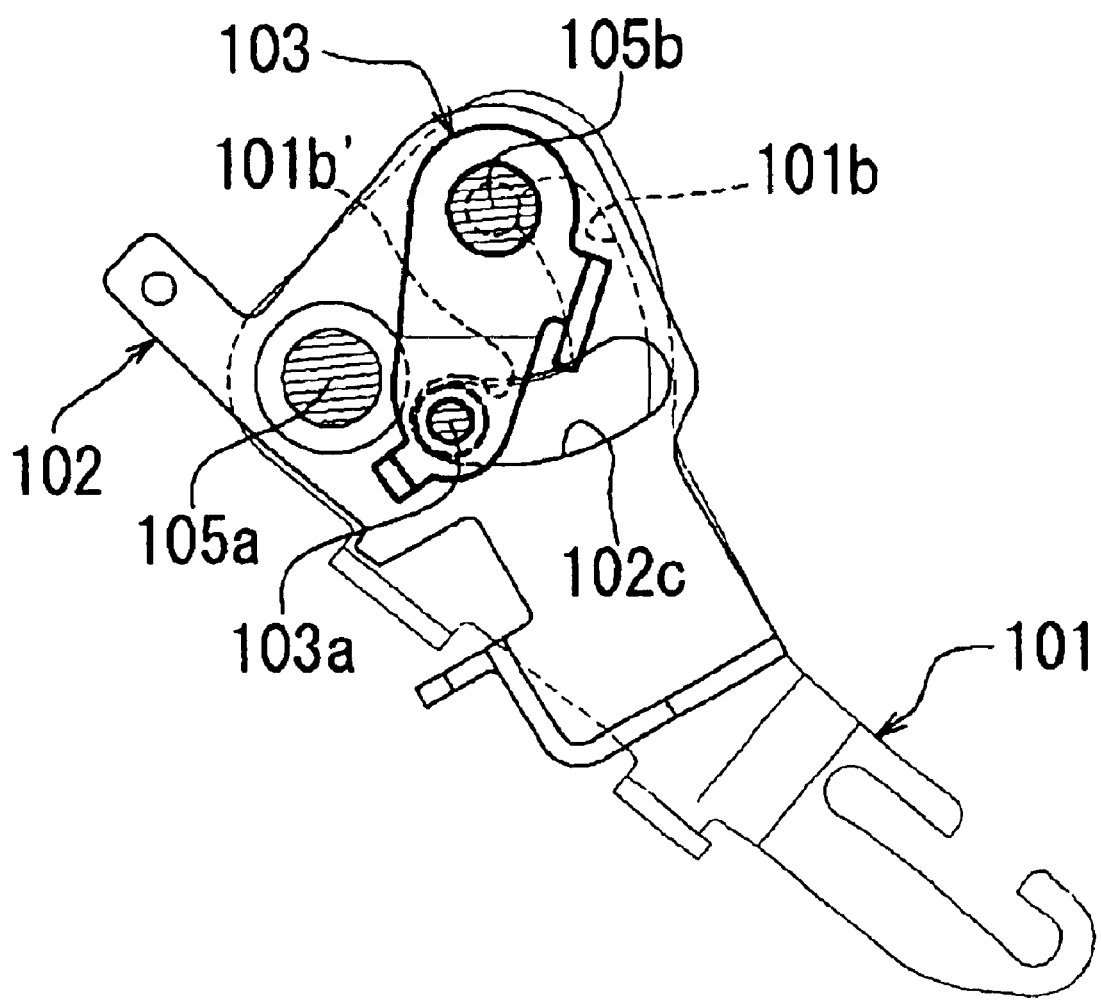
FIG. 26 is a schematic view of an operation showing the switching mechanism shown in FIG. 25 in a state of being pulled in accordance with a lever operation.

When the seat stops sliding at the rear most, the slide pin 103a is positioned at one hole end of the circular arc-shaped guide hole 102c provided in the second rotary plate 102 and enters into the circular arc portion 101b' of the first rotary plate 101 around the second supporting shaft 105b, so that when the passenger executes the pulling operation of the first rotary plate 101 by the strap, the first rotary plate 101 swings and rotates around the first supporting shaft 105a as shown in FIG. 26, and the circular arc portion 101b' of the first rotary plate 101 and the guide hole 102c of the second rotary plate 102 press the slide pin 103a by the respective hole edges, thereby swinging and rotating the second rotary plate 102 around the first supporting shaft 105a.

Figure 27:
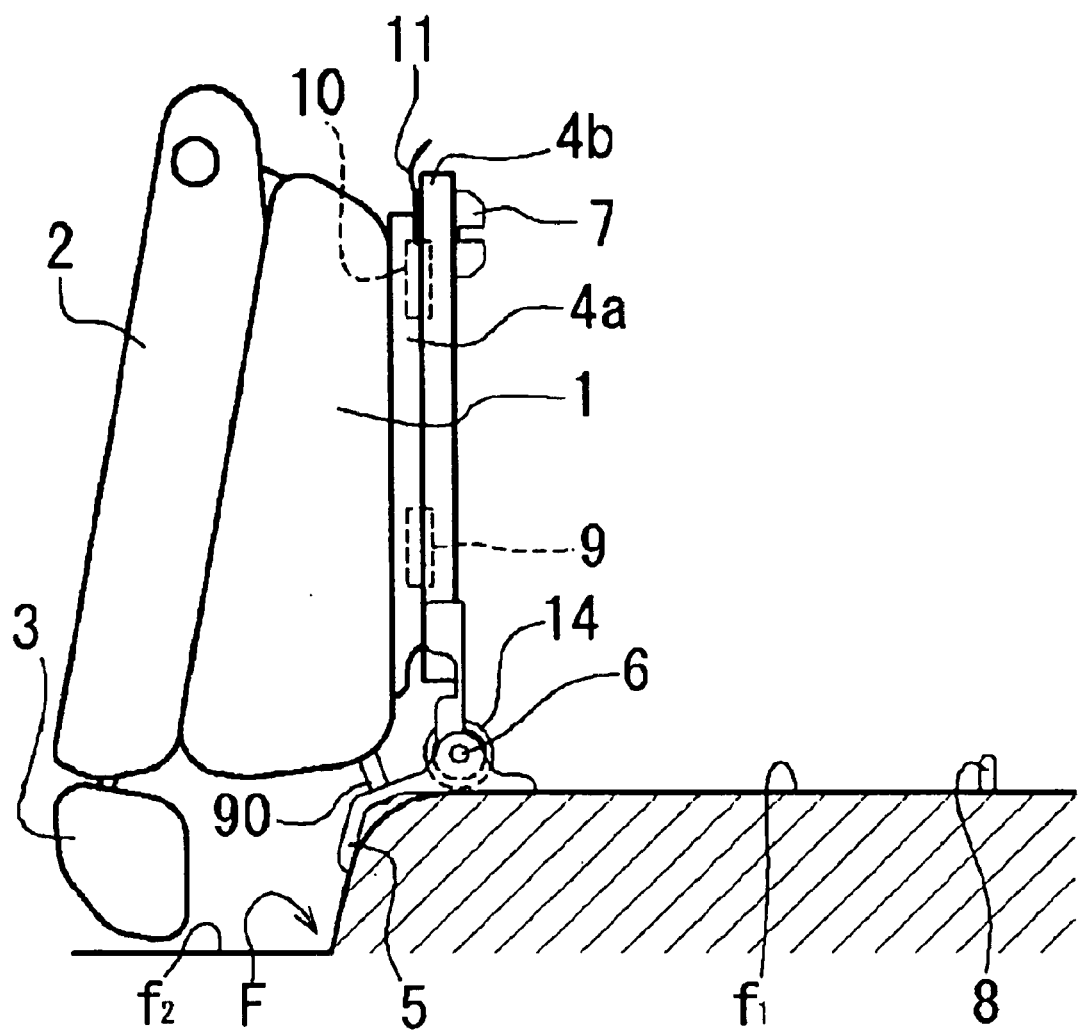
FIG. 27 is a side elevational view showing the seat shown in FIG. 21 in a kicked up state.

In the case that the second rotary plate 102 swings and rotates, since the first traction wires 107 and 107' are connected to the second rotary plate 102, the first traction wires 107 and 107' are pulled, the ratchet 73 of the striker locks 7 and 7' is disengaged from the latch 72 due to the pulling operation of the first traction wires 107 and 107', and the latch 72 is unlocked so as to cancel the grip of the strikers 8 and 8' due to the spring bias, thereby becoming in a state capable of kicking up the whole of the seat in a state of folding the seat back 2 from the rear portion side as shown in FIG. 27.

Figure 28:
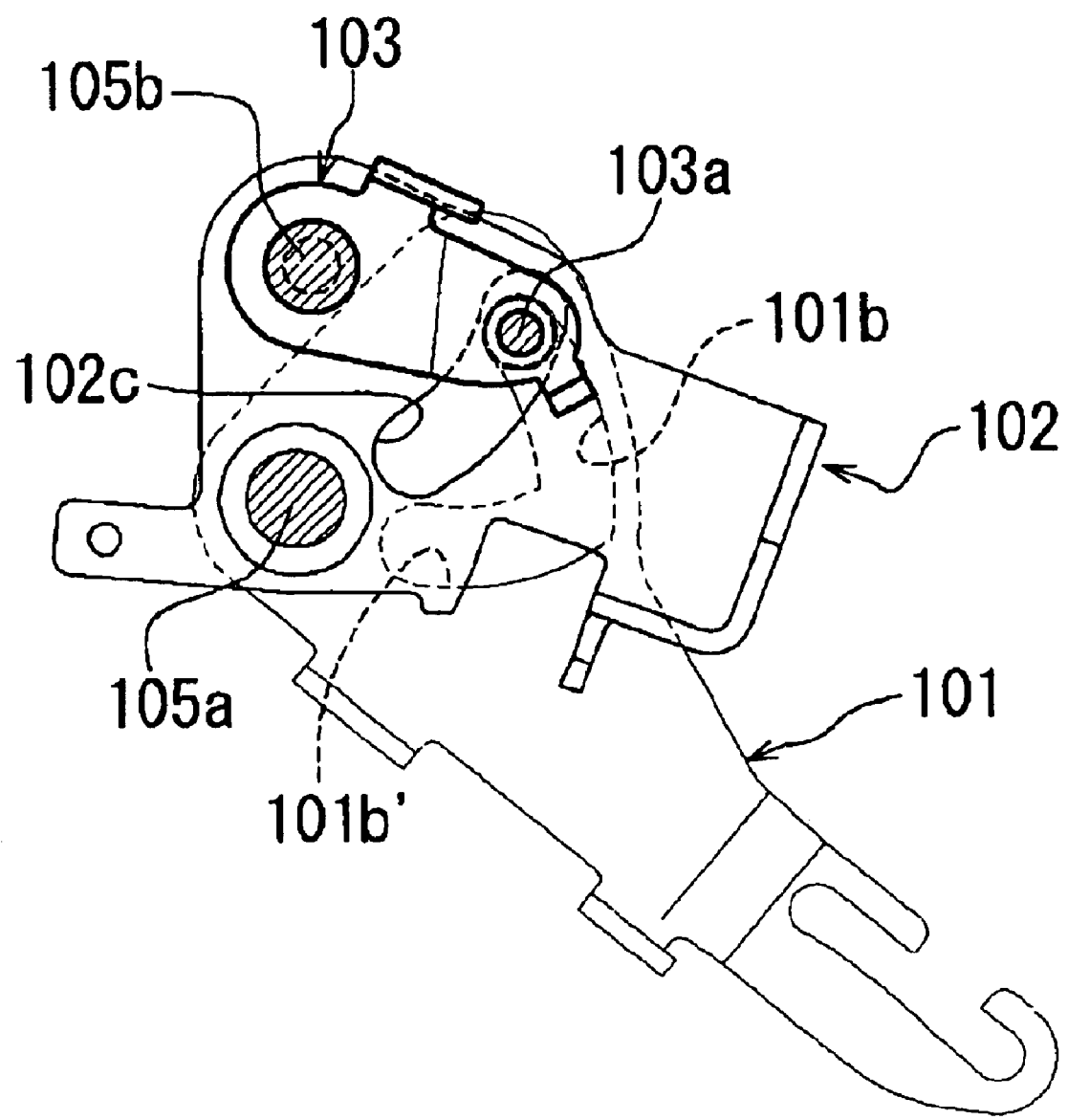
FIG. 28 is a schematic view of an operation showing the switching mechanism shown in FIG. 7 in a swinging and missing state on the basis of an improper switching.
Figure 29:
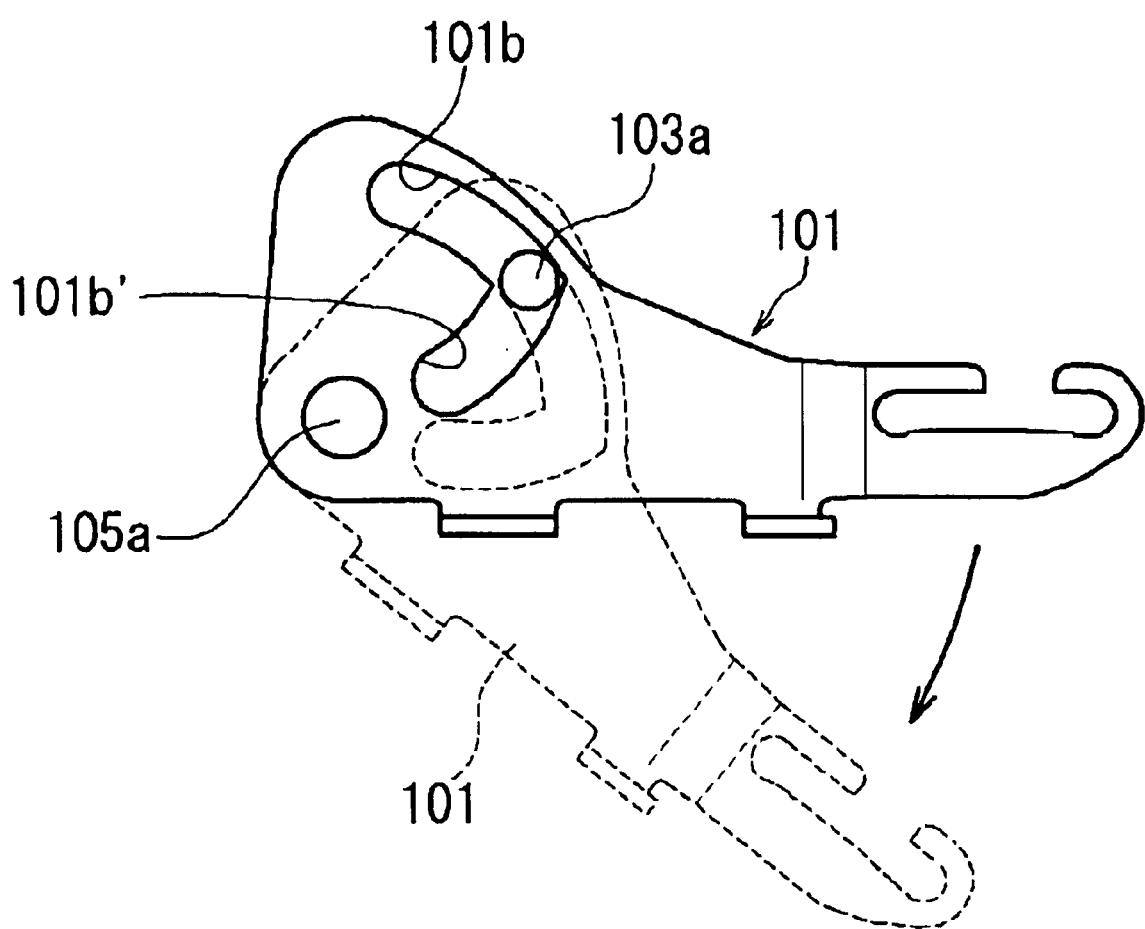
FIG. 29 is a schematic view of an operation showing the switching mechanism shown in FIG. 28 by the first rotary plate.

On the contrary, in the case of an erroneous operation in which the seat is not slid to the rear side within the vehicle, when the passenger pulls the first rotary plate 101 by the strap 11, the first rotary plate 101 only swings and rotates the slide pin 103a around the second supporting shaft 105b while receiving in the circular arc portion 101b of the guide hole as shown in FIG. 28, thereby not rotating the second rotary plate 102 to which the first traction wires 107 and 107' are connected. Accordingly, since the first rotary plate 101 is swung and missed as shown in FIG. 29, whereby it is impossible to unlock the strikers 7 and 7', the operator is informed of the erroneous operation.

In summary, since the switching mechanism 10 is not pulled by the second traction wire 108 only by folding the seat at the seated position in the front side within the vehicle, it is impossible to switch the striker locks 7 and 7' to a mechanism which can be operated by an artificial operation by the strap 11. Accordingly, even when the passenger operates the switching mechanism 10 by the strap 11, the ratchet 73 of the striker locks 7 and 7' does not move, and the latch 72 can not be unlocked, so that it is impossible to kick up the whole of the seat.

On the contrary, when sliding the seat to a predetermined position in the rear side within the vehicle, a tensile force by the second tension wire 108 is applied to the switching mechanism 10, whereby the switching mechanism 10 is switched to a mechanism which can be operated by the artificial operation by the strap 11. Accordingly, when the passenger operated the switching mechanism 10 in accordance with the pulling operation by the strap 11, the striker locks 7 and 7' is unlocked, whereby it is possible to kick up the whole of the seat to the upper side from the rear portion side.

Even when the operation by the strap 11 is applied from the rear portion side of the seat, it is always necessary to execute a step of moving the whole of the seat to the predetermined position in the rear side within the vehicle so as to kick up the whole of the seat, so that it is possible to prevent the matter that the head rest 3 is brought into contact with the back portion of the front side seat or is brought into contact with the floor surface $f_1$ of the vehicle body floor F so as to be stopped in the middle of the kicking up operation from being generated. Further, it helps to pay attention to the peripheral passengers and loads due to the attitude change of the seat, at a time of forward tilting the seat back 2 including the head rest 3.

Figure 30:
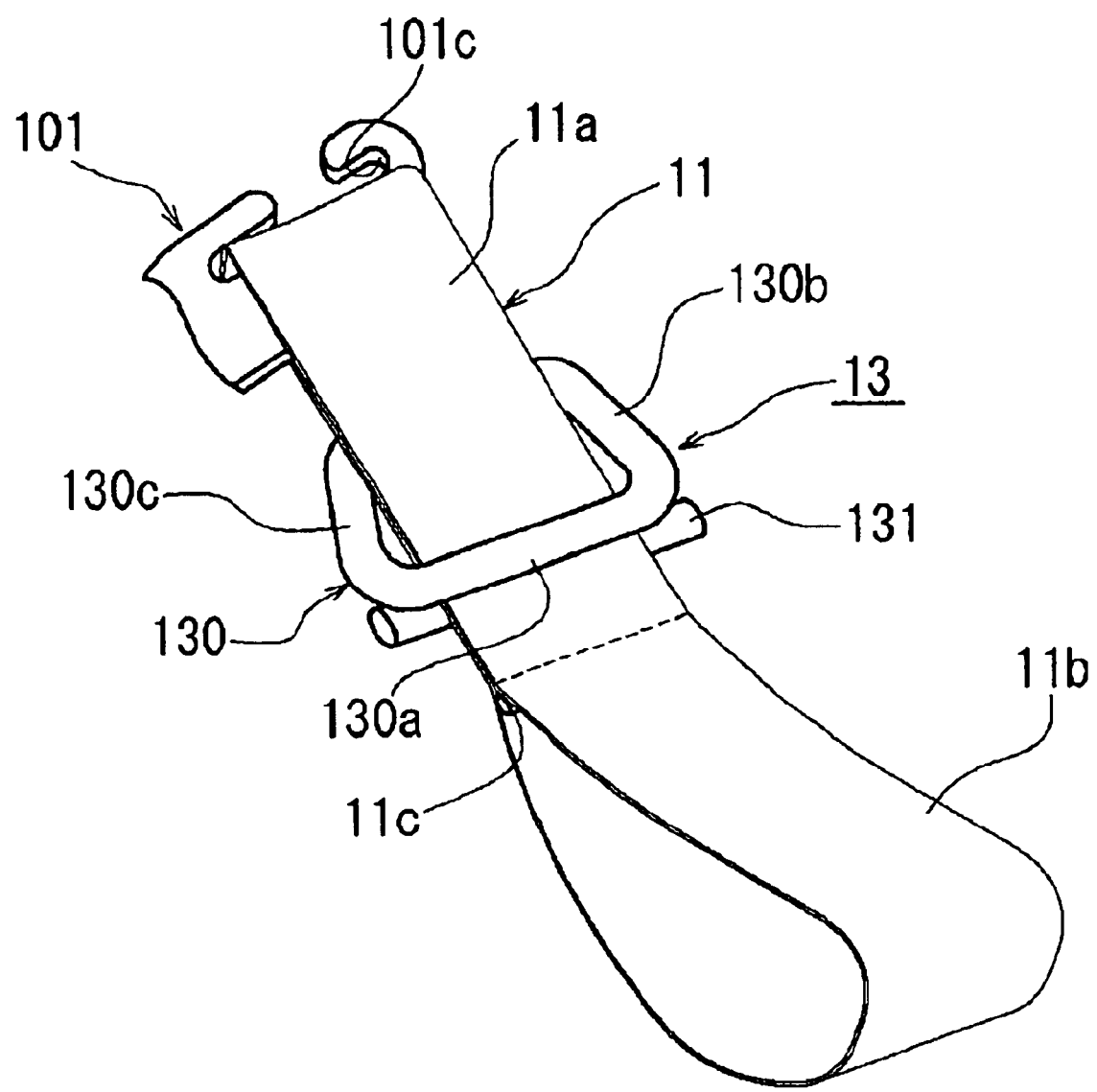
FIG. 30 is a perspective view showing a strap provided in the switching mechanism shown in FIG. 7.
Figure 31:
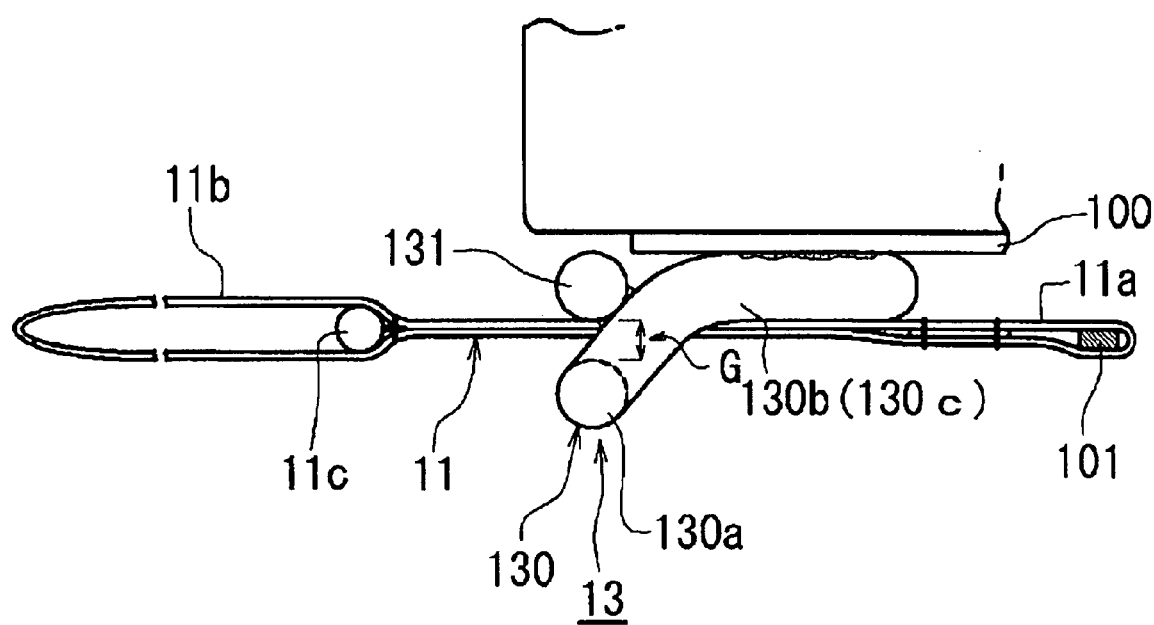
FIG. 31 is a side elevational view showing a mounting structure of the strap shown in FIG. 30.

In the switching mechanism 10 mentioned above, the strap 11 formed in a loop shape from a flat belt as shown in FIGS. 30 and 31 is provided. The strap 11 is provided so that the belt base portion 11a is hooked to the receiving port 101c of the first rotary plate 101 corresponding to the operation lever, and the grip portion 11b is inserted to the strap holder 13 so as to be drawn out.

The strap holder 13 is constituted by a round bar made of metal, and is constructed by a supporting frame 130 which has a substantially quadrilateral plan shape and is bent in an L shape in a side view, and a guide shaft 131 which is in parallel to a lower horizontal shaft portion 130a of the supporting frame 130 at a distance of an insertion gap G for the strap 11 therefrom, and is arranged over and fixed to a pulling side of the strap 11 on middle portions of side shaft portions 130b and 130c inclined to right and left oblique downward sides. The strap holder 13 is mounted and fixed by welding the supporting frame 130 to the placing plate 100 of the switching mechanism 10.

Figure 32:
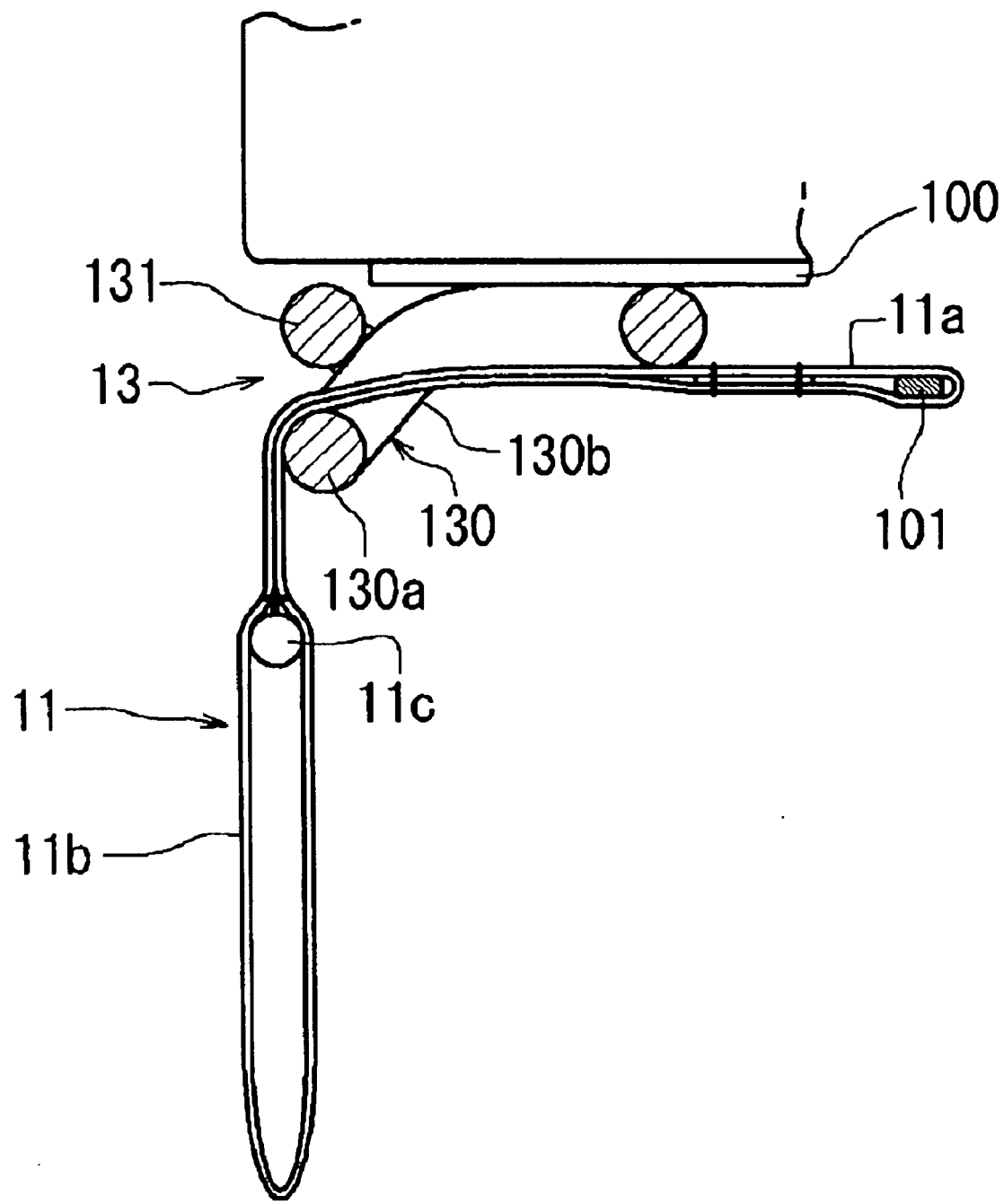
FIG. 32 is a side elevational view showing the strap shown in FIG. 30 in a provision attitude at a time of not being used.
Figure 33:
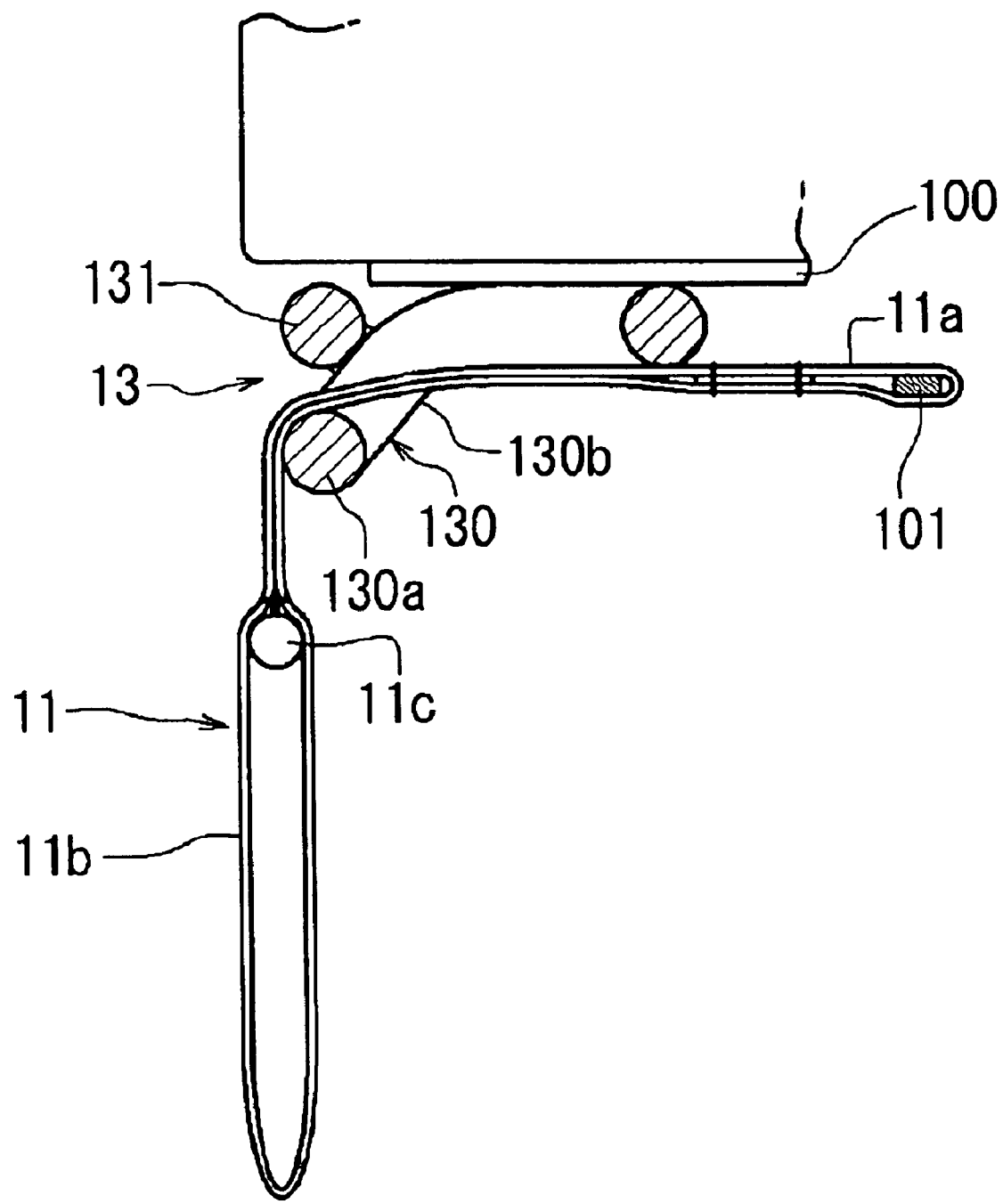
FIG. 33 is a side elevational view showing the strap shown in FIG. 30 in a pulled attitude at a time of being used.

Since the strap 11 is provided so as to be suspended from the placing plate 100 of the switching mechanism 10 by the supporting frame 130 of the strap holder 13 as shown in FIG. 32, the strap 11 does not form an obstacle even when being positioned around the feet of the rear passenger, and it is possible to prevent the strap from winding around a peripheral mechanism, so that the strap can be provided with a good usability. Further, since the strap 11 is positioned on the same plane as that of the first rotary plate 101 of the switching mechanism 10 by the supporting frame 130 as shown in FIG. 33, and the guide shaft 131 is positioned on an extension line of the first rotary plate 101, it is possible to linearly apply the pulling force to the first rotary plate 101 even when pulling the strap 11 from the strap holder 13 to the upper side by the grip portion 11b, so that it is possible to stably interlock the switching mechanism 10 by the first rotary plate 101.

In addition to the structure mentioned above, a stopper pin 11c which prevents the grip portion 11b from being shifted from the insertion gap G between the lower horizontal shaft portion 130a of the supporting frame 130 and the guide shaft 131 to the inner side is provided in the strap 11 by being sewn within a loop base portion of the grip portion 11b. With the help of the stopper pin 11c, since the loop-shaped grip portion 11b is not shifted to the inner side from the insertion gap G, the strap 11 can be provided so as to be easily operated.

Figure 34:
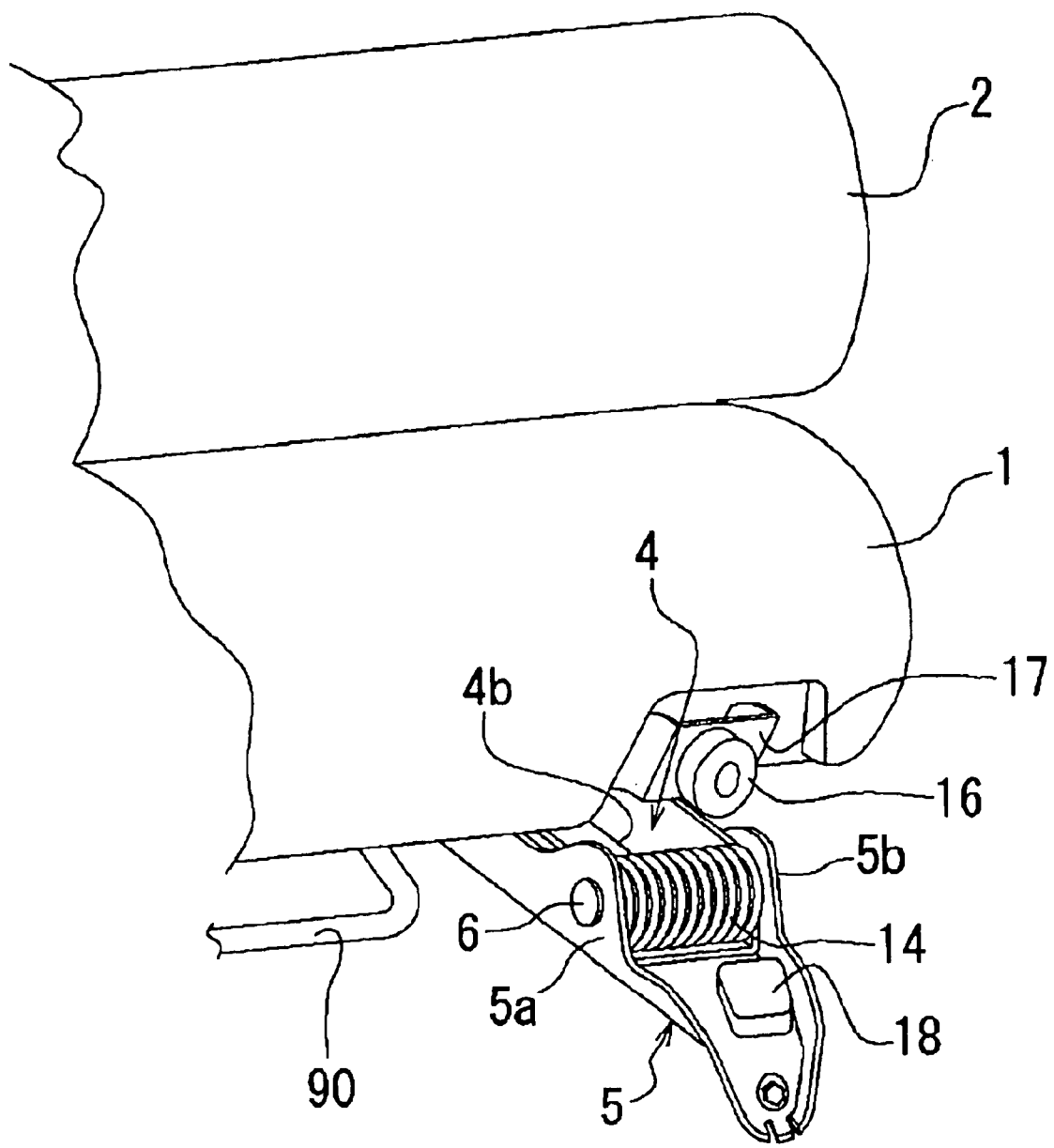
FIG. 34 is a perspective view mainly showing a kick-up spring provided in the seat shown in FIG. 1.

The slide type foldable seat is structured so as to be automatically kicked up by providing with a kick-up spring 14 (only one side is illustrated) on the supporting shaft 6 inserted into the lower rail 4b of the slide rail 4 and the bearing bracket 5a and 5b of the stand leg portion 5 as shown in FIG. 34. A torsion coil spring is provided as the kick-up spring 14, and is provided so as to store a spring force accompanying with hooking and mounting the seat cushion 1 to the striker 8, by fastening one spring end to the lower rail 4b of the slide rail 4 and fastening another spring end to the stand leg portion 5. A structure having a strong spring torque corresponding to a weight of a whole of the seat is provided as the torsion coil spring 14 by winding a thick spring wire rod in a coil shape having a large diameter. Further, two torsion coil springs 14 are fitted and provided on the axes of the respective supporting shafts 6 in the stand leg portions 5 axially supporting the right and left lower rails 4b, and provided so as to smoothly kick up the whole of the heavy seat.

Figure 35:
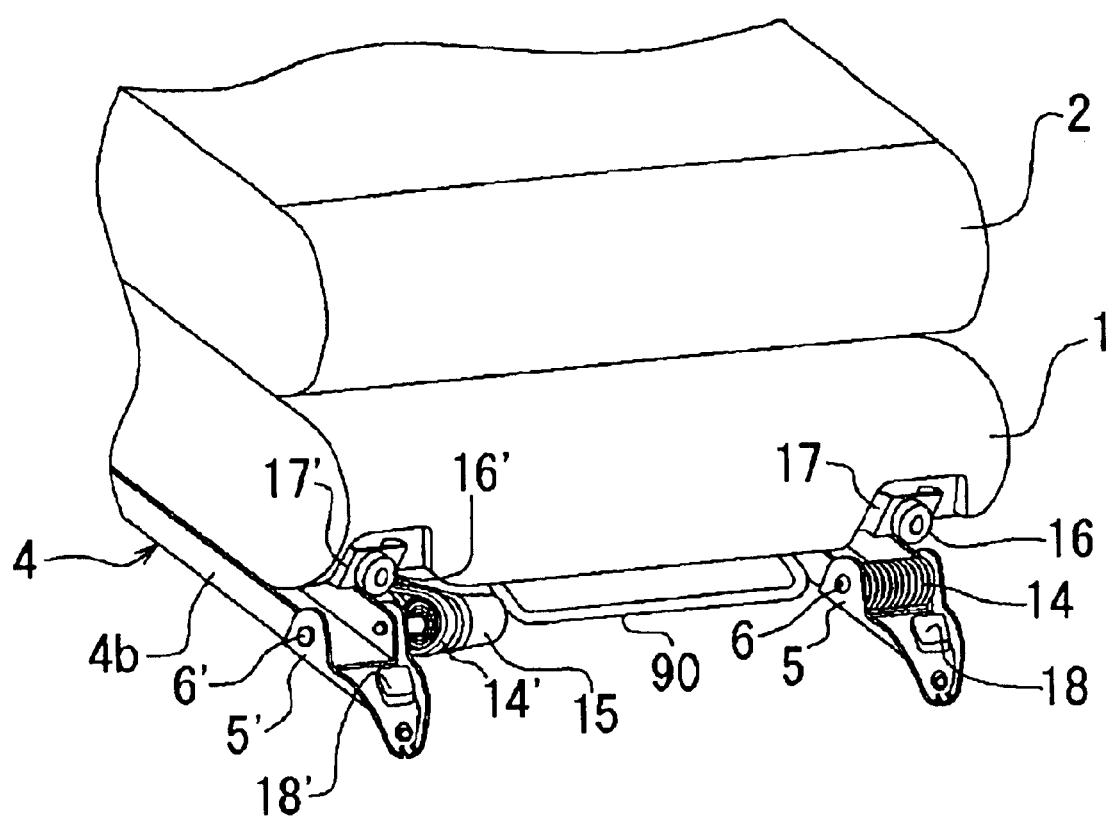
FIG. 35 is a perspective view mainly showing another kick-up spring provided in the seat shown in FIG. 1.
Figure 36:
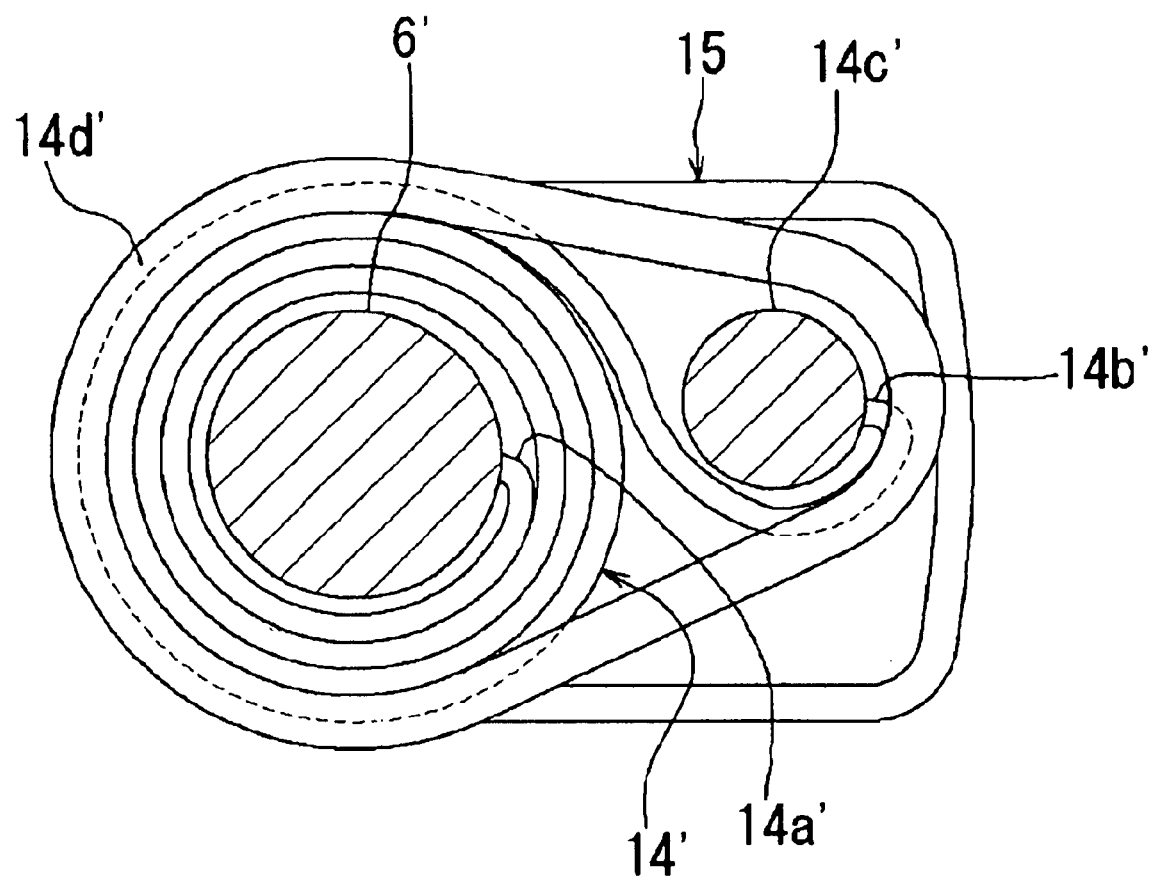
FIG. 36 is a side elevational view mainly showing a spiral spring corresponding to the kick-up spring shown in FIG. 35.

Two springs are provided so as to increase a self holding force at a time of kicking up the seat by setting one 14 to a torsion coil spring and another 14' to a spiral spring as shown in FIG. 35. In this case, the torsion coil spring 14 is provided on the axis of the supporting shaft 6 inserted into the lower rail 4b as mentioned above, and the spiral spring 14' is provided on the axis of the supporting shaft 6' protruding to the inner side from the lower rail 4b'. The spiral spring 14' is provided by connecting a spring end 14a' in an inner side of spiral onto the axis of the supporting shaft 6' protruding to the inner side from the lower rail 4b and connecting a spring end 14b' in an outer side of spiral onto an axis of a supporting shaft 14c' being in parallel to the supporting shaft 6' and protruding to an inner side from the lower rail 4b, as shown in FIG. 36. Further, it is provided by being coated by a rubber ring-shaped surrounding cover 14d'.

A speed reduction damper 15 restricting a kick-up speed of the whole of the seat is provided in a side in which the spiral spring 14' is provided. The speed reduction damper 15 is constituted by a hydraulic cylinder, interlocks with a spring deformation of the spiral spring 14' by connecting a cylinder rod to the supporting shaft 6' of the lower rail 4b' at an axial end and fixing a cylinder tube by the supporting shaft 14c' protruding from the stand leg portion 5' so as to prevent rotation, and is mounted so as to gradually reduce a speed of the whole of the instantaneously jumping up seat from the middle of the kicking up.

Together with the springs 14 and 14' and the speed reduction damper 15, elastic pads 16 and 16' restricting a kick-up attitude of the whole of the seat are provided so as to be brought into contact with the respective stand leg portions 5 and 5'. The elastic pads 16 and 16' are mounted so as to be directed to a lower side from bracket plates 17 and 17' protruding to a front face of the seat cushion 1. Spacer pads 18 and 18' adjusting the kick-up attitude of the whole of the seat are provided in the stand leg portions 5 and 5' in both sides, with respect to the elastic pads 16 and 16'.

In the seat, even when the whole of the seat is heavy, the seat can be instantaneously and smoothly kicked up by the springs 14 and 14'. Further, the seat can be kicked up by gradually reducing the speed by the speed reduction damper 15 after the middle of the kicking up, and when the seat is completely kicked up, with the help of the spiral spring 14' which is brought into contact with the elastic pads 16 and 16' and spacer pads 18 and 18' so as to increase the self holding force at a time of kicking up the seat, it is possible to damp an impact caused by the kicking up of the whole of the seat and it is possible to stably hold the kick-up attitude.

Figure 37:
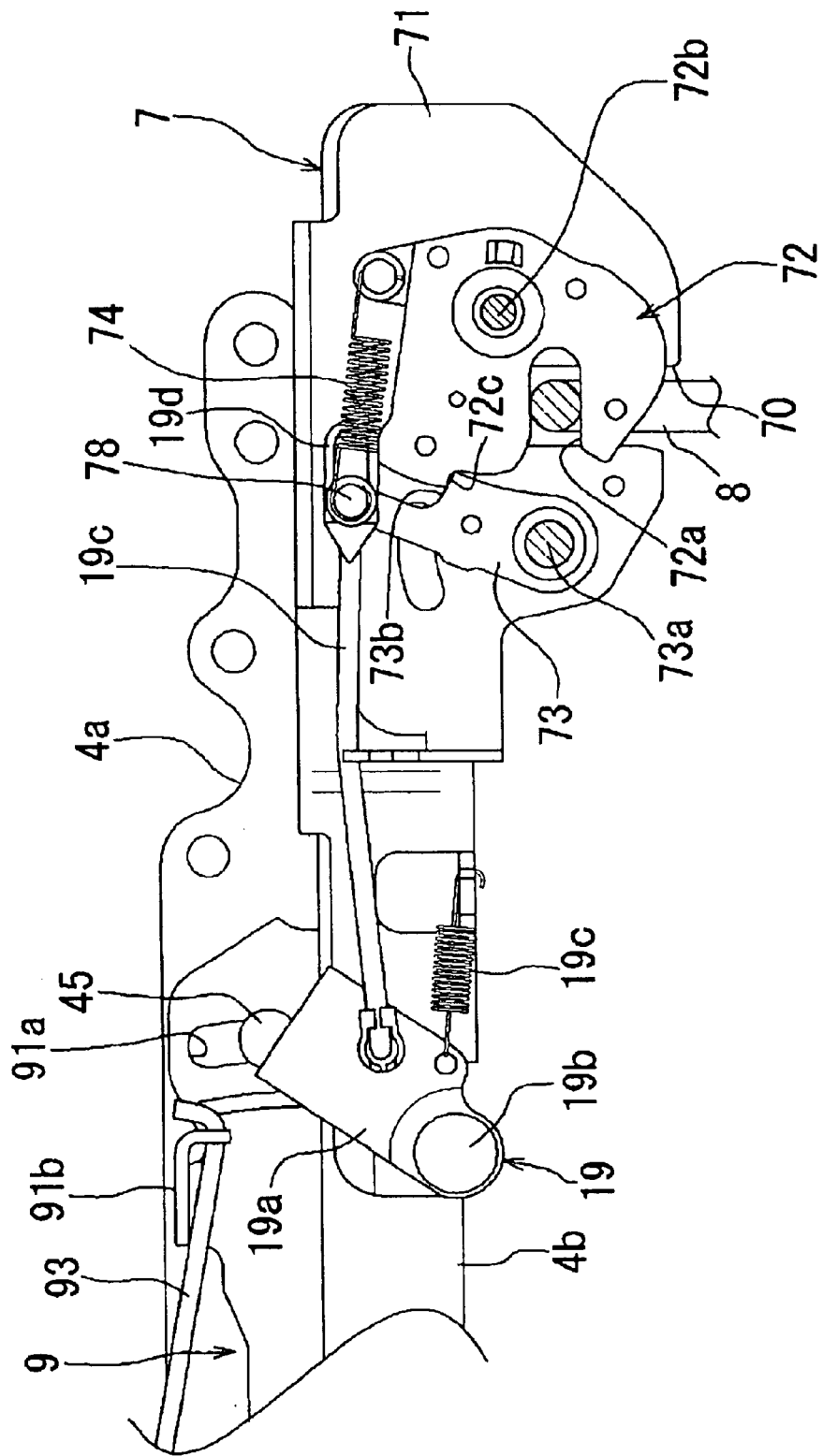
FIG. 37 is a side elevational view showing a stopper mechanism of a slide lock provided in the slide rail shown in FIG. 3 in a retracted state.

A stopper mechanism 19 making it impossible to unlock at a time of kicking up the seat is provided in the slide lock 9 mentioned above, as shown in FIG. 37. The stopper mechanism 19 is structured by axially supporting and pivoting a stopper piece 19a capable of being brought into contact with the axial stop piece 91b for stopping a spring provided in the lock plate 91 to the side portion of the lower rail 4b by the supporting shaft 19b so as to freely swing, and connecting the stopper piece 19a to the ratchet 73 of the striker lock 7 by a connection rod 19c.

The connection rod 19c is mounted by inserting one axial end to the side portion of the stopper piece 19a in an upper side of the supporting shaft 19b and bearing a pin 78 hooking the coil spring 74 to the ratchet 73 in one spring end by a stop ring 19d at an axial end so as to pivot another axial end to the ratchet 73. The stopper piece 19a is supported so as to be pulled to the side in which the striker lock 7 is provided, by the coil spring 74 in such a manner as to be retracted from the axial stop piece 91b of the lock plate 91. Further, it is also supported so as to be pulled in a direction of being retracted from the axial stop piece 91b of the lock plate 91 by a coil spring 19e extended with respect to the lower rail 4b.

Figure 38:
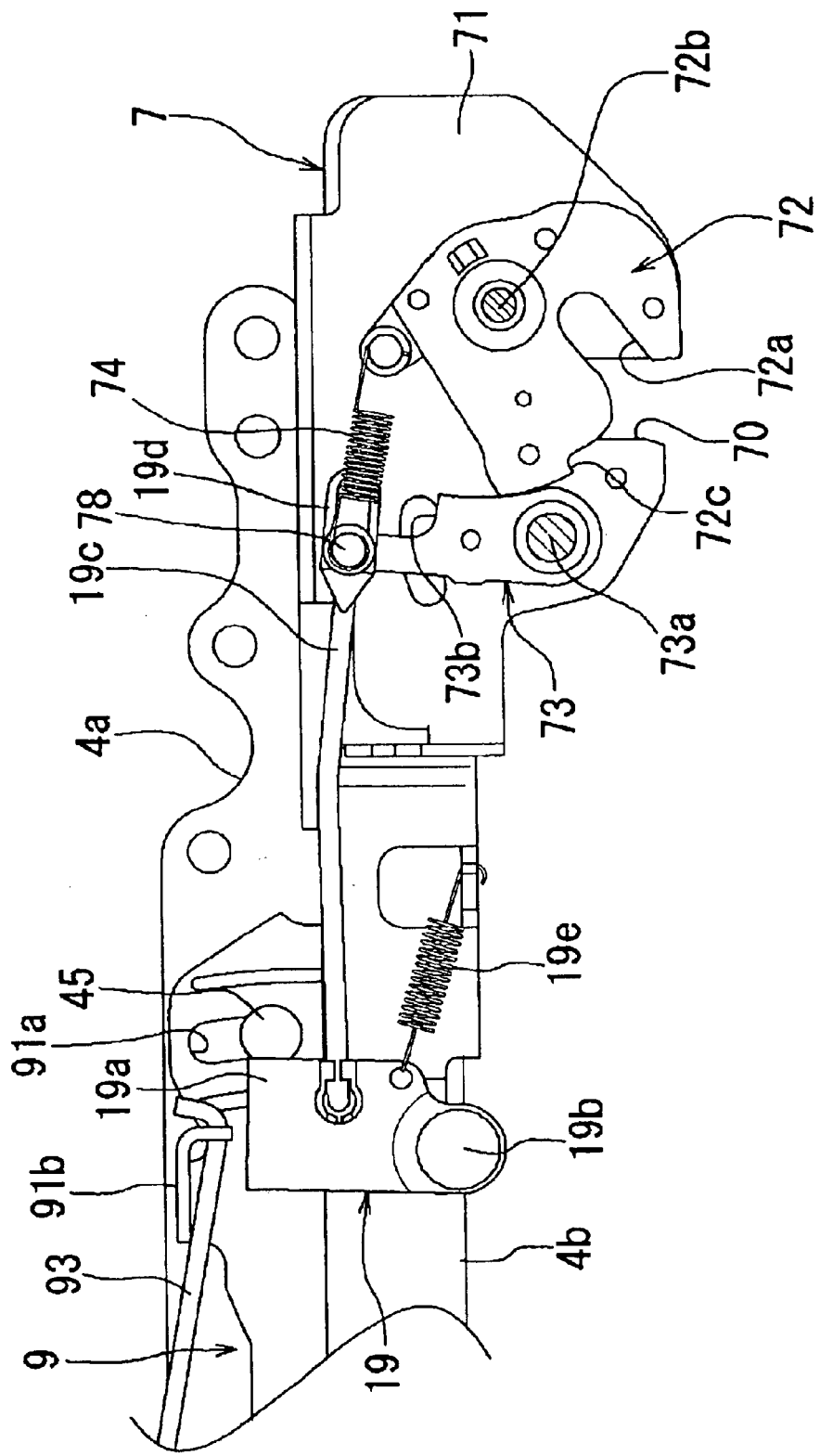
FIG. 38 is a side elevational view showing the stopper mechanism shown in FIG. 37 in an operated state.

In the stopper mechanism 19, when the striker lock 7 is operated in the unlocking direction as shown in FIG. 38, one jaw of the latch 72 is brought into contact with the side portion of the ratchet 73 as mentioned above, and the ratchet 73 is kept in a state of being pressed and supported at the swung position by the latch 72, so that the stopper piece 19a is swung and positioned so as to oppose to the axial stop piece 91b of the lock plate 91 by the connection rod 19c extending from the ratchet 73 around the supporting shaft 19b. With the help of this stopper mechanism 19, even when the passenger grips by mistake the operation lever 90 of the slide lock 9 by a hand at a time of kicking up the seat, the stopper piece 19a is brought into contact with the axial stop piece 91b of the lock plate 91, so that it is possible to keep the slide lock 9 in a state in which the slide lock 9 can not be unlocked so that the lock plate 91 does not swing, and it is possible to keep the kicked up position of the seat in the slide position at the rear side within the vehicle.

When returning the seat to the normal seating attitude from the kicked up state, the striker 8 enters into the gripping jaw 72a of the latch 72 from the receiving port 70 of the striker lock 7 accompanying with the tilt of the seat cushion 1, whereby the striker 8 kicks the gripping jaw 72a of the latch 72 from one jaw side, so that the latch 72 is biased by spring so as to be engaged with the striker 8, and the receiving projection 73b of the ratchet 73 and the retainer projection 72c of the latch 72 are engaged with each other so as to keep the locking state applied by the striker locks 7 and 7'.

When locking the striker locks 7 and 7', the stopper mechanism 19 of the slide lock 9 is operated so as to retract the stopper piece 19a from the axial stop piece 91b of the lock plate 91, so that there can be achieved a state capable of unlocking the slide lock 9 by the operation lever 90. Thereafter, when the passenger unlocks the slide lock 9 by the operation lever 90 and slides the seat to the original seating position, the return coil springs 106a and 106b and the tension spring 106c return the respective constituting members 102 to 104 including the first rotary plate 101, whereby the switching mechanism 10 is also returned to the original position.

In the above description, the terms and expressions used in the present specification are employed only for describing and do not limit the contents of the present invention any more. If there are used some attributive terms and expressions, there is no intention of excluding a structure which is equivalent to the aspects of the present invention mentioned above and a part of the structure. Accordingly, various kinds of modifications can be applied within the scope of the present invention to which a patent right is requested.

What is claimed is:

1. A slide type foldable seat for a vehicle, said vehicle having a vehicle body floor and stand leg portions mounted to said vehicle body floor so as to stand up from said vehicle body floor; said seat comprising:

a seat cushion;

slide rail means including a pair of upper rail members and a pair of lower rail members;

said upper rail members being attached to a lower portion of said seat cushion and slidably supported to said lower rail member;

said lower rail members having front end portions and rear end portions;

said lower rail members being pivotally supported at said front end portions thereof to said stand leg portions by first supporting shafts, so that said seat can be pivoted around said first supporting shafts together with said upper and lower rail members;

cooperating means for causing said lower rail member to be releasably locked with respect to said vehicle body floor and preventing pivotal movement of said seat around said first supporting shafts;

said cooperating means comprising striker lock means provided at portions of said lower rail members which are close to said rear end portions of said lower rail members, and strikers mounted to said vehicle body floor so as to stand up from said vehicle body floor;

said striker lock means being adapted to be releasably engaged with said strikers;

locking means for causing said upper rail members to be releasably locked with respect to said lower rail members and preventing said upper rail members from being slid along said lower rail members;

operating means for releasing said striker lock means from said striker and allowing said seat to be pivoted around said first supporting shaft together with said upper and lower rail members; and switching means mounted on said lower portion of said seat cushion for preventing said operating means from being operated so as to cause said striker lock means to be released from said strikers when said seat is in a forward position, and for switching a state of said operating means to a state where said operating means can be operated so as to cause said striker lock means to be released from said strikers when said seat is moved to a predetermined rearward position.

2. A slide type foldable seat for a vehicle, according to claim 1, wherein said switching means comprises a placing plate serving as a base of said switching means and mounted on said lower portion of said seat cushion;

a first rotary plate acting as said operating means;

a second rotary plate;

said first rotary plate and said second rotary plate being pivotally supported to said placing plate by a second supporting shaft so as to be opposed to one another;

a third rotary plate;

a fourth rotary plate;

said third rotary plate and said fourth rotary plate being pivotally supported to said second rotary plate by a third supporting shaft so as to be opposed to one another;

a tension coil spring stretched between said third rotary plate and said fourth rotary plate;

a first return coil spring stretched between said placing plate and said first rotary plate;

a second return coil spring stretched between said second rotary plate and said fourth rotary plate;

said first rotary plate having a first guide hole of a substantially L-shape;

said first guide hole having a first circular arc-shaped hole portion around said second supporting shaft and a second circular arc-shaped hole portion around said third supporting shaft;

said first circular arc-shaped hole portion and said second circular arc-shaped hole portion being continuously connected to each other;

said second rotary plate having a second guide hole of a substantially circular arc-shape extending so as to be aligned with said second circular arc-shaped hole portion of said first rotary plate;

said third rotary plate provided with a slide pin;

said slide pin being projected from said third rotary plate and received in a middle point between said first circular hole portion and said second circular hole portion of said first rotary plate through said second guide hole of said second rotary plate;

first traction wires connected between said first rotary plate and said striker lock means; and a second traction wire connected between said fourth rotary plate and one of said upper rail members;

wherein when said second traction wire is drawn by rearward movement of said seat, said third and fourth rotary plates are swung and rotated around said third supporting shaft and said slide pin projecting from said third rotary plate into said first guide hole of said first rotary plate is moved to an end of said second circular arc-shaped hole portion of said first rotary plate, and said guide pin is held by said second circular arc-shaped hole portion of said first rotary plate and said second guide hole of said second rotary plate, whereby said first rotary plate is swung while pulling said first traction wires and switched to a state where said first rotary plate can be operated so as to cause said striker lock means to be released from said strikers; and wherein when said seat is kept at the forward position, said second traction wire is not pulled, so that said first rotary plate is kept in a state where it does not pull said first traction wires, even by operating said first rotary plate.

3. A slide type foldable seat for a vehicle, according to claim 2, wherein said striker lock means comprises side plate means attached to said lower rail members and provided with downward U-shaped receiver ports for receiving said strikers, hook-like latches pivotally supported to said side plate means for releasably engaging said strikers, cam-like ratchets pivotally supported to said side plate means for stopping said latches, first springs urging said latches in such a direction that said latches are disengaged from said strikers, and second springs urging said ratchets in such a direction that said ratchets are engaged with said latches, said first traction wires being connected to said ratchets.

4. A slide type foldable seat for a vehicle, according to claim 2, wherein the one of said upper rail members is provided with a wire pulling mechanism, said wire pulling mechanism comprising a protruding plate mounted to a side portion of the one of said upper rail members, said protruding plate having an elongated hole extending in such a direction that said upper rail members are slid along said lower rail members, a slide plate provided with a pair of supporting pins, said slide plate being supported to said protruding plate by causing said supporting pins to be slidably engaged with said elongated hole, and a stopper piece adapted to be brought into contact with one of said supporting pins of said slide plate immediately before a rearward movement dead point of said seat, said stopper piece standing up from one of said lower rail members which mates with the one of said upper rail members, said second traction wire being connected to said slide plate.

5. A slide type foldable seat for a vehicle, according to claim 1 or 2, further including a strap for pulling said operating means, said strap being drawn from said operating means.

6. A slide type foldable seat for a vehicle, according to claim 5, wherein said seat cushion is provided at said lower portion thereof with a strap holder, said strap being inserted through said strap holder and drawn out to the external side.

7. A slide type foldable seat for a vehicle, according to claim 6, wherein said strap holder includes a supporting frame of a substantially quadrilateral plan shape mounted on said lower portion of said seat cushion, said supporting frame being bent in a substantially L-shape as viewed from the side, a guide shaft bridged between middle portions of both sides of said supporting frame, said guide shaft being in parallel to a lower horizontal portion of said supporting frame and spaced apart from said lower horizontal portion of said supporting frame at a space through which said strap is inserted.

8. A slide type foldable seat for a vehicle, according to claim 7, wherein said strap is provided with a stopper pin for preventing said strap from being shifted inwardly from said space between said supporting frame and said guide shaft.

9. A slide type foldable seat for a vehicle, according to claim 1, further including spring means mounted on said first supporting shafts for causing said seat to be automatically pivoted around said first supporting shafts when said striker lock means are released from said strikers.

10. A slide type foldable seat for a vehicle, according to claim 1, further including spring means mounted on said first supporting shafts for causing said seat to be automatically pivoted around said first supporting shafts when said striker lock means are released from said strikers, and a speed reduction damper mounted on one of said first supporting shafts for restricting a pivotal movement speed of said seat.

11. A slide type foldable seat for a vehicle, according to claim 1, further including elastic pads provided at a front side of said seat cushion, said elastic pads being adapted to be brought into contact with said stand leg portions so as to prevent shock from being transmitted to said seat when said seat is kicked up around said supporting shafts.

12. A slide type foldable seat for a vehicle, according to claim 1, further including elastic pads provided at a front side of said seat cushion, said elastic pads being adapted to be brought into contact with said stand leg portions so as to prevent shock from being transmitted to said seat when said seat is kicked up around said first supporting shafts, and spacer pads provided at said stand leg portions, said spacer pads being adapted to be brought into contact with said elastic pads so as to adjust the kick-up attitude of said seat, when said seat is kicked up around said first supporting shafts.

13. A slide type foldable seat for a vehicle, according to claim 1, further including an operating lever coupled to said upper rail members for operating said locking means so as to cause said upper rail members to be released from said lower rail members, and wherein said locking means comprises lock plates pivotally supported to said upper rail members, said lock plates being provided with retainer pieces projecting laterally from said lock plates, said retainer pieces being formed with a plurality of receiving holes, spring means for urging said lock plates upward, and a plurality of protruding teeth provided at said lower rail members, said upper rail members being adapted to be locked with respect to said lower rail members by engagement of said receiving holes with said protruding teeth.

14. A slide type foldable seat for a vehicle, according to claim 3, further including stopper mechanisms for preventing said receiving holes of said retainer pieces from accidentally being disengaged from said protruding teeth, and wherein said striker lock means comprises side plate means attached to said lower rail members and provided with downward U-shaped receiver ports for receiving said strikers, hook-like latches pivotally supported to said side plate means for releasably engaging said strikers, cam-like ratchets pivotally supported to said side plate means for stopping said latches, first springs urging said latches in such a direction that said latches are disengaged from said strikers, and second springs urging said ratchets in such a direction that said ratchets are engaged with said latches, said stopper mechanisms comprising protruding pieces provided at said lock plates, stopper pieces pivotally supported to said lower rail members, said protruding pieces being adapted to be brought into contact with said protruding pieces, to thereby prevent said receiving holes of said retainer pieces from accidentally being disengaged from said protruding teeth, and connection rods interconnecting said stopper pieces and said ratchets.

15. A slide type foldable seat for a vehicle, according to claim 13 or 14, wherein said operating lever extends toward a front side of said seat cushion from said upper rail members.

\* \* \* \* \*